(12) United States Patent
Okada et al.

(10) Patent No.: US 7,244,945 B2
(45) Date of Patent: Jul. 17, 2007

(54) SCINTILLATOR PANEL, RADIATION DETECTOR AND MANUFACTURE METHODS THEREOF

(75) Inventors: Satoshi Okada, Kanagawa (JP); Yoshihiro Ogawa, Tokyo (JP); Katsuro Takenaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/933,249

(22) Filed: Sep. 3, 2004

(65) Prior Publication Data

US 2005/0035298 A1 Feb. 17, 2005

Related U.S. Application Data

(62) Division of application No. 10/066,618, filed on Feb. 6, 2002, now Pat. No. 6,847,041.

(30) Foreign Application Priority Data

Feb. 9, 2001 (JP) ............................ 2001-034044
Aug. 30, 2001 (JP) ............................ 2001-261908

(51) Int. Cl.
*G01T 1/24* (2006.01)
(52) U.S. Cl. ............................ 250/370.11; 250/370.1; 250/336.1; 250/390.11
(58) Field of Classification Search ........... 250/370.11, 250/370.1, 336.1, 390.11; 264/138, 39, 119, 264/139, 162, 163, 239, 153
See application file for complete search history.

(56) References Cited

U.S. PATENT DOCUMENTS

| | | | |
|---|---|---|---|
| 4,365,155 A | 12/1982 | Oi et al. ................. 250/370.1 |
| 5,153,438 A | 10/1992 | Kingsley et al. ........ 250/370.09 |
| 5,818,035 A | 10/1998 | Krivanek et al. ......... 250/208.1 |
| 5,902,491 A | 5/1999 | Carpenter et al. ............. 216/2 |
| 6,031,234 A * | 2/2000 | Albagli et al. .......... 250/370.11 |
| 6,132,942 A | 10/2000 | Woodworth et al. ........ 430/496 |
| 6,160,259 A | 12/2000 | Petrillo et al. ......... 250/363.07 |
| 6,328,838 B1 * | 12/2001 | Wirth et al. ................ 156/212 |
| 6,384,417 B1 | 5/2002 | Okumura et al. ........... 250/367 |
| 6,389,096 B1 | 5/2002 | Hoffman et al. ............. 378/19 |
| 6,429,437 B1 * | 8/2002 | Laugier ................. 250/370.11 |
| 6,469,307 B2 | 10/2002 | Takabayashi et al. .. 250/370.11 |
| 6,551,176 B1 | 4/2003 | Garretson .................... 451/56 |
| 6,563,120 B1 | 5/2003 | Baldwin et al. ............ 250/367 |
| 6,573,506 B2 * | 6/2003 | Sato et al. ............. 250/361 R |
| 6,847,041 B2 * | 1/2005 | Okada et al. .......... 250/370.11 |
| 2002/0162965 A1 | 11/2002 | Okada et al. .......... 250/370.11 |
| 2003/0173493 A1 | 9/2003 | Homme et al. ............. 250/200 |

\* cited by examiner

*Primary Examiner*—David Porta
*Assistant Examiner*—Christine Sung
(74) *Attorney, Agent, or Firm*—Fitzpatrick, Cella, Harper & Scinto

(57) ABSTRACT

A scintillator panel having a wavelength conversion member has some problems: lowered durability to be caused by an area not covered with a protective layer around a projection formed on the wavelength conversion member surface; lowered resolution response and CTF caused by an irregularity of the film thicknesses of wavelength conversion members and a variation in gaps between wavelength conversion members and sensor panels; and breakage of the sensor panel by projections when a radiation detector is formed by bonding the scintillator panel and sensor panel. At least one of these problems can be solved by a scintillator panel having projections on the wavelength conversion member surface whose sizes are reduced, and by a radiation detector having such a scintillator panel and a sensor panel bonded together.

29 Claims, 22 Drawing Sheets

SCINTILLATOR PANEL, RADIATION DETECTOR AND MANUFACTURE METHODS THEREOF

This is a divisional application of Application No. 10/066,618, filed Feb. 6, 2002 now U.S. Pat. No. 6,847,041, the contents of which are incorporated by reference.

BACKGROUND OF THE INVENTION

1. Field of the Invention

The present invention relates to a scintillator panel, a radiation detector and manufacture methods thereof, and more particularly to a radiation detector to be used with a medical X-ray diagnosis apparatus, a non-destructive inspection apparatus or the like and its manufacture method.

In this specification, the term "radiation" is intended to include electromagnetic waves such as X-rays, α-rays, β-rays and γ-rays.

2. Related Background Art

Digitalization is accelerating in the field of medical apparatuses. There is a paradigm shift of Roentgen photography from a conventional film screen type to an X-ray digital radiography type.

FIG. 15 is a cross sectional view of an X-ray detector. As shown in FIG. 15, a scintillator panel 110 has: a phosphor layer 113 made of column-shaped crystallized phosphor; a base member 111 for supporting the phosphor layer 113; a reflection layer 112 made of an aluminum thin film for reflecting light converted by the phosphor layer 113 toward a sensor panel 100 to be described later; and a protective layer 114 made of organic resin for protecting the phosphor layer 113 and the like from external air.

The sensor panel 100 has: a glass substrate 101; a photoelectric conversion unit 102 made of photosensors and TFT's of amorphous silicon; a wiring unit 103 for transferring electric signals converted by the photoelectric conversion unit 102; and a protective layer 104 made of silicon nitride or the like for protecting the photoelectric conversion unit 102 and wiring unit 103.

The sensor panel 100 and scintillator panel 110 are bonded together by an adhesion layer 120, and this assembly is sealed with a sealing member 140. In order to suppress a variation in resolutions, it is necessary to precisely control the thickness of each layer through which light transmits. It is particularly necessary not to make the adhesion layer 120 too thick. To this end, after the adhesion layer 120 is coated between the sensor panel 100 and scintillator panel 110, this assembly is pressed by a roller so as not to make the adhesion layer 120 too thick.

In FIG. 15, reference numeral 115 represents a projection of about several tens μm to several hundreds μm which is partially formed, while the phosphor layer 113 is crystallized in a column-shape, by abnormal growth to be caused by dusts, splashes during evaporation, irregular surfaces of the base member 111 or the like. FIG. 15 schematically shows the scintillator panel having such projections.

FIG. 16A is an enlarged view showing the bonded portion between a sensor panel 100 without a projection and a scintillator panel 110. FIG. 16B is an enlarged view showing the bonded portion between a sensor panel 100 with a projection 115 and a scintillator panel 110. In FIG. 16B, h0 represents a thickness of the adhesion layer 120 near the projection 115, and T0' represents a thickness of the adhesion layer 120 at a position apart from the projection 115.

A downward incident X-ray transmits through the base member 111 and reflection layer 112 and is absorbed in the phosphor layer 113 which in turn radiates visible light. Since this visible light propagates in the phosphor layer 113 toward the sensor panel 100 side without diffusion, it transmits through the protective layer 114, adhesion layer 120 and protective layer 104, and becomes incident upon the photoelectric conversion unit 102.

The incident visible light is converted into an electric signal by the photoelectric conversion unit 102, and read to the external via the wiring unit 103 under the switching control. In this manner, the X-ray detector shown in FIG. 15 converts input X-ray information into a two-dimensional digital image.

If the scintillator panel having projections on the surface of the phosphor layer such as shown in FIG. 15 is bonded to the sensor panel, the projection may break a photosensor of the photoelectric conversion unit or the wiring unit as shown in FIG. 16B. If the tip of the projection is sharp, this sharp tip easily enters the photosensor or wiring unit and breaks it. If a photosensor is broken, a pixel defect is generated in a digital image, whereas if a wiring unit is broken, a line defect is generated. If the bonding process is performed, the center of the projection is depressed and the phosphor layer becomes thin in the depressed area. The radioactive amount in the depressed area may become different from other areas, which lowers photosensitivity.

Even if the height of a projection is low and the photoelectric conversion unit is not broken, the projection is pushed by the sensor panel so that the phosphor layer is warped about the projection and the thickness h0 of the adhesion layer becomes larger than the thickness T0'. The width of scattered visible light incident upon the photoelectric conversion unit may change, which lowers the resolution of a digital image. The adhesion layer may be made thick so that the projection does not break a photosensor or the like and is accommodated in the adhesion layer. In this case, however, as shown in FIG. 19, since a gap between a wavelength conversion layer and sensor panel becomes large, the resolution of a digital image lowers. A practical resolution response is generally 0.7 or larger. In order not to set the resolution response to a value smaller than 0.7, it is preferable to make the adhesion layer thin.

The presence of a projection may allow air bubbles to enter the adhesion layer and adhesive agent cannot be distributed uniformly.

It becomes difficult to perfectly cover the surface of the phosphor layer if there is a projection. If the phosphor layer is made of CsI or the like, the phosphor layer may be dissolved because of deliquescence of CsI.

SUMMARY OF THE INVENTION

The invention solves at least one of the above-described problems. It is an object of the invention to provide a scintillator panel and a radiation detector of the type that a digital image has no defect, a resolution does not lower, and a phosphor layer does not corrode or dissolve for a long period of time.

In order to solve the above object, the invention provides a radiation detector having a wavelength conversion member for converting radiation into light and a sensor panel for detecting light converted by the wavelength conversion member, wherein: after projections formed on a surface of the wavelength conversion member to be bonded to the sensor panel are made small, the wavelength conversion member and the sensor panel are bonded together.

It is more preferable to cover the wavelength conversion member with a protective layer because the durability is improved.

The above object is achieved also by a radiation detector having a wavelength conversion member for converting radiation into light and a sensor panel for detecting light converted by the wavelength conversion member, wherein: after top surfaces of projections formed on a surface of the wavelength conversion member to be bonded to the sensor panel are made parallel to a surface of the sensor panel, the wavelength conversion member and the sensor panel are bonded together.

It is more preferable to cover the whole surface of the wavelength conversion member with a protective layer because the durability is improved.

The above object is achieved also by a scintillator panel having a wavelength conversion member formed on a substrate, the wavelength conversion member converting radiation into light, and projections formed on a surface of the wavelength conversion member on the side opposite to the substrate being made smaller than a threshold value.

The above object is achieved also by a scintillator panel having a wavelength conversion member for converting radiation into light, wherein: a first protective layer is formed on the wavelength conversion member, projections on a surface of the wavelength conversion member are made small or removed from the upper side of the first protective layer, and thereafter a second protective layer is formed.

The above object is achieved also by a method of manufacturing a scintillator panel having a wavelength conversion member formed on a substrate, the wavelength conversion member converting radiation into light, the method comprising a step of: making projections formed on a surface of the wavelength conversion member on the side opposite to the substrate equal to or smaller than a threshold value.

The above object is achieved also by a method of manufacturing a radiation detector having a wavelength conversion member for converting radiation into light and a sensor panel for detecting light converted by the wavelength conversion member, the method comprising a step of: after making small projections formed on a surface of the wavelength conversion member to be bonded to the sensor panel, bonding the wavelength conversion member and the sensor panel.

The above object is achieved also by an apparatus for manufacturing a scintillator panel having a wavelength conversion member for converting radiation into light, the apparatus comprising: means for detecting projections and recesses on a surface of the wavelength conversion member; means for measuring a height difference of the projections and recesses; means for comparing the height difference with a predetermined threshold value; and means for reducing the sizes of the projections and recessed in accordance with a comparison result.

The details of the invention will be give in connection with embodiments to be described later.

DETAILED DESCRIPTION OF THE PREFERRED EMBODIMENTS

A wavelength conversion member for converting radiation into visible light is used with a scintillator panel or a radiation detector. If there is a projection on the surface of the wavelength conversion member, this projection poses problems such as a imaging defect, a lowered resolution response and a lowered durability of the wavelength conversion member. According to the invention, the projection formed on the surface of the wavelength conversion member is removed or made small. The projection is not limited only to a convex surface, but it includes any area having a height difference between convex and concave surfaces.

Embodiments of the invention will be described with reference to the accompanying drawings.

First Embodiment

Figure 1:
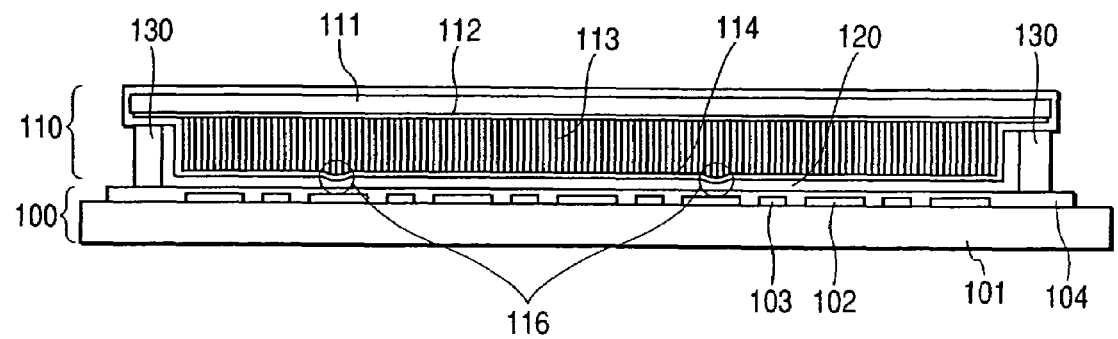
FIG. 1 is a schematic cross sectional view of an X-ray detector according to a first embodiment of the invention.

FIG. 1 is a schematic cross sectional view of a radiation detector according to the first embodiment. As shown in FIG. 1, a scintillator panel 110 has: a phosphor layer 113 made of column-shaped crystallized phosphor, as a wavelength conversion member for converting incident radiation into visible light; a base member 111 for supporting the phosphor layer 113; a reflection layer 112 made of an aluminum thin film for reflecting light converted by the phosphor layer 113 toward a sensor panel 100 to be described later; and a protective layer 114 made of organic resin for protecting the phosphor layer 113 and the like from external air. The base member may be made of CFRP or the like which contains amorphous carbon or carbon fibers. If such a conductive material is used for the base member, a protective layer for preventing corrosion of the reflection layer may be provided between the base member and reflection layer.

The phosphor layer may be made of column-shape crystallized material, granular crystallized material such as CsI bonded by binder, or single crystal or the like.

The sensor panel 100 has: a glass substrate 101; a photoelectric conversion unit 102; a wiring unit 103 for transferring electric signals converted by the photoelectric conversion unit 102; and a protective layer 104 made of silicon nitride or the like for protecting the photoelectric conversion unit 102 and wiring unit 103. The photoelectric conversion unit 102 has photosensors and TFT's made of amorphous silicon.

The sensor panel 100 and scintillator panel 110 are bonded together by an adhesion layer 120, with a gap therebetween being set to about 50 µm at a maximum.

In FIG. 1, reference numeral 116 represents a projection in a range from about several tens µm to several hundreds µm, and later set to 50 µm at a maximum, which projection is partially formed, while the phosphor layer 113 is crystallized in a column-shape, by abnormal growth to be caused by dusts, splashes during evaporation, irregular surfaces of the base member 111 or the like.

Figure 2:
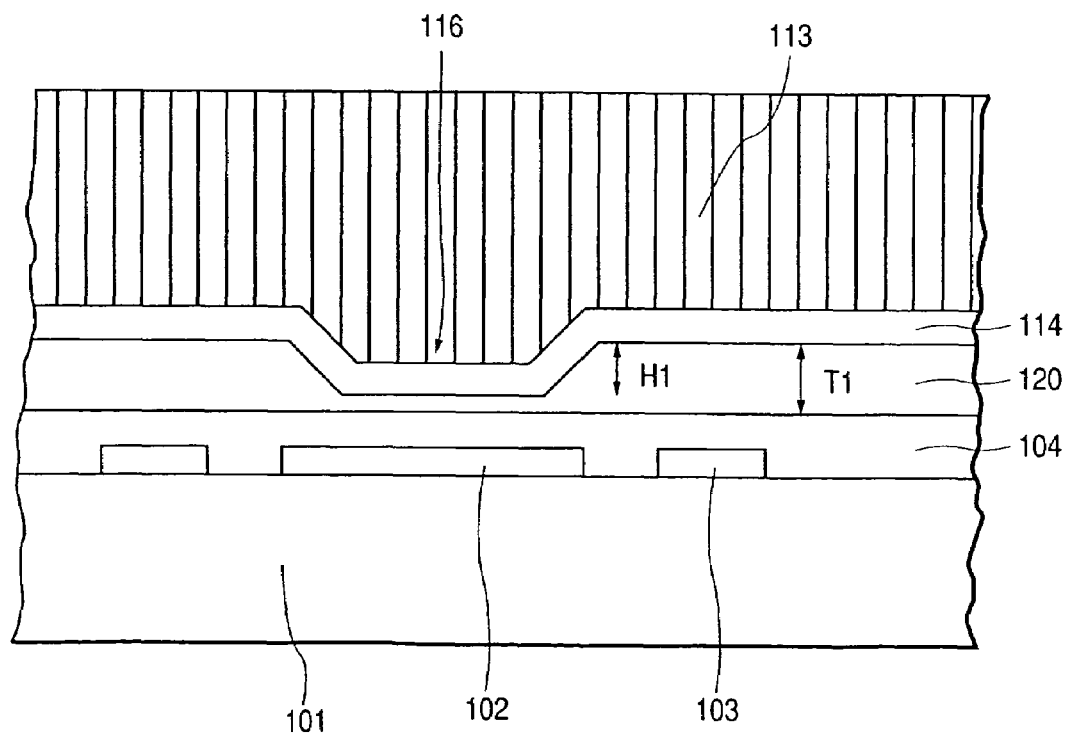
FIG. 2 is an enlarged view of the X-ray detector near a projection shown in FIG. 1.

FIG. 2 is an enlarged view showing the bonded portion near the projection 116 shown in FIG. 1. In FIG. 2, T1 represents a distance between the scintillator panel 110 and sensor panel 100, and H1 represents a height of the projection 116. T1 and H1 satisfy the relation to be described later.

In this embodiment, before the scintillator panel 110 and sensor panel 100 are bonded together, the height of the projection 116 is measured. If the height is greater than a predetermined threshold value, the projection is processed to have a height equal to or lower than the threshold value, and thereafter the scintillator panel 110 and sensor panel 100 are bonded together.

The distance T1 between the scintillator panel 110 and sensor panel 100 shown in FIG. 2 is set to the value equal to or smaller than the threshold value so that the projection does not break the photoelectric conversion unit 102 or wiring unit 103 and the scintillator panel 110 is not warped.

Figure 19:
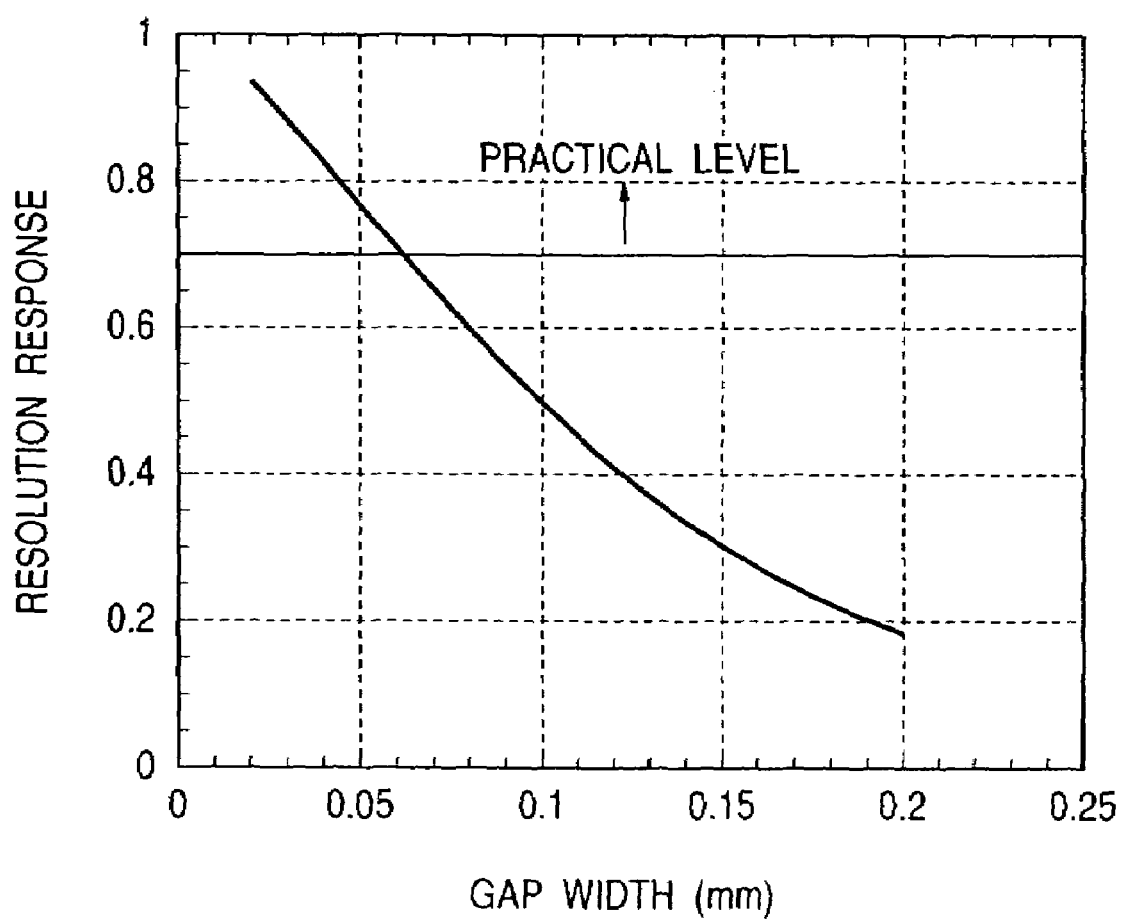
FIG. 19 is a graph showing a relation between a thickness of an adhesion layer and a resolution of a digital image.

FIG. 19 is a graph to be used when the threshold value is determined. This graph shows the relation between a gap between the scintillator panel and sensor panel and a resolution of a digital image. In FIG. 19, the abscissa represents the gap between the scintillator panel and sensor panel, and the ordinate represents a resolution response of a digital image.

As shown in FIG. 19, as the gap becomes broad, the resolution of a digital image lowers. A practical resolution response is generally 0.7 or larger. In order not to set the resolution response to a value smaller than 0.7, it is preferable to set the thickness of the adhesion layer to 0.05 mm or thinner.

This is because, as a gap between the phosphor layer and the sensor panel is broader, the light scattering width is made greater, thereby image information would be out of focus. Therefore, it is preferable to thin the adhesion layer between the phosphor layer 113 and sensor panel 100 shown in FIG. 19 to obtain the practical resolution response.

It is preferable therefore to set the height of the projection 116 to 0.05 mm or 50 µm or lower so that the projection 116 does not break the photoelectric conversion unit 102 or the like. CTF lowers if the gap between the scintillator panel and sensor panel becomes broad. From these viewpoints, T1 and H1 are set to satisfy the following relation:

$$50 \ \mu m \geq T1 \geq H1$$

If a process margin is taken into consideration, T1 is more preferably set to 20 µm or thinner. For example, the thickness T1 of the adhesion layer 120 is set to about 12 µm if the height H1 of the projection 116 is 10 µm, by taking the process margin into consideration.

Next, an operation of the radiation detector will be described. An incident X-ray transmits through the base member 111 and reflection layer 112 and is absorbed in the phosphor layer 113 which in turn radiates visible light. This visible light propagates in the phosphor layer 113 toward the sensor panel 100 side, transmits through the protective layer 114, adhesion layer 120 and protective layer 104, and becomes incident upon the photoelectric conversion unit 102.

The incident visible light is converted into an electric signal by the photoelectric conversion unit 102, and read to the external via the wiring unit 103 under the switching control. In this manner, the X-ray detector shown in FIG. 1 converts input X-ray information into a two-dimensional digital image.

The photoelectric conversion unit 102 may be of any type such as a CCD and a CMOS sensor or a metal insulator semiconductor (MIS) photosensor and a PIN photosensor to be described below.

Figure 17:
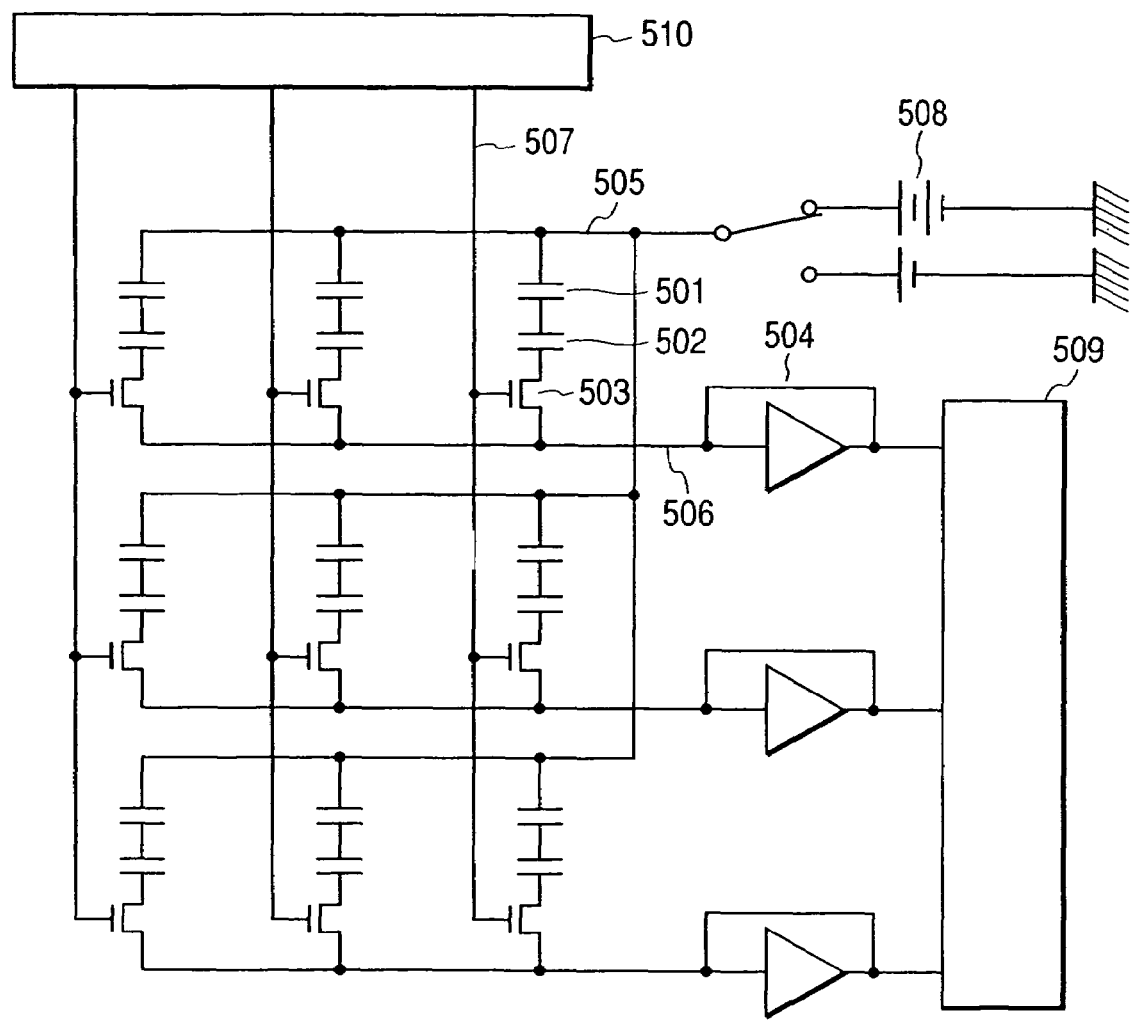
FIG. 17 is an equivalent circuit diagram of a photoelectric conversion unit with MIS type photosensors.

FIG. 17 is an equivalent circuit diagram of the photoelectric conversion unit 102 having MIS photosensors. In FIG. 17, first and second capacitors 501 and 502 store converted electric. charges. A TFT 503 controls the transfer of electric charges stored in the first and second capacitors 501 and 502. A gate drive unit 510 generates a control signal for controlling the on/off of TFT 503. A gate line 507 transfers the control signal generated by the gate drive unit 510. A signal line 506 transfers electric charges transferred from TFT 503. An amplifier 504 amplifies the transferred electric charges. A read unit 509 reads the electric charges amplified by the amplifier 504 and sends them to an external. A bias power supply 508 supplies a bias voltage to the first and second capacitors 501 and 502. A bias line 505 interconnects the bias power supply 508 and the first and second capacitors 501 and 502.

In FIG. 17, although 3×3 pixels are shown, a large number of N×M pixels are used in both vertical and horizontal directions, depending upon application fields.

First, a constant voltage is applied from the bias power supply 508 to the first and second capacitors 501 and 502 via the bias line 505 to refresh them. Thereafter, a different constant voltage is supplied from the bias power supply 508 and then radiation is applied to generate pairs of electrons and holes (carriers) corresponding to visible light converted by the phosphor layer 113 and store the carriers in the first and second capacitors 501 and 502.

In this state, the gate drive unit 510 generates a control signal to turn on the gate of TFT 503 via the gate line 507. The stored electric charges flow through the signal line 506, are amplified by the amplifier 504, and transferred to the read unit 509. The read unit 509 performs predetermined signal processing to output an image signal.

Figure 18:
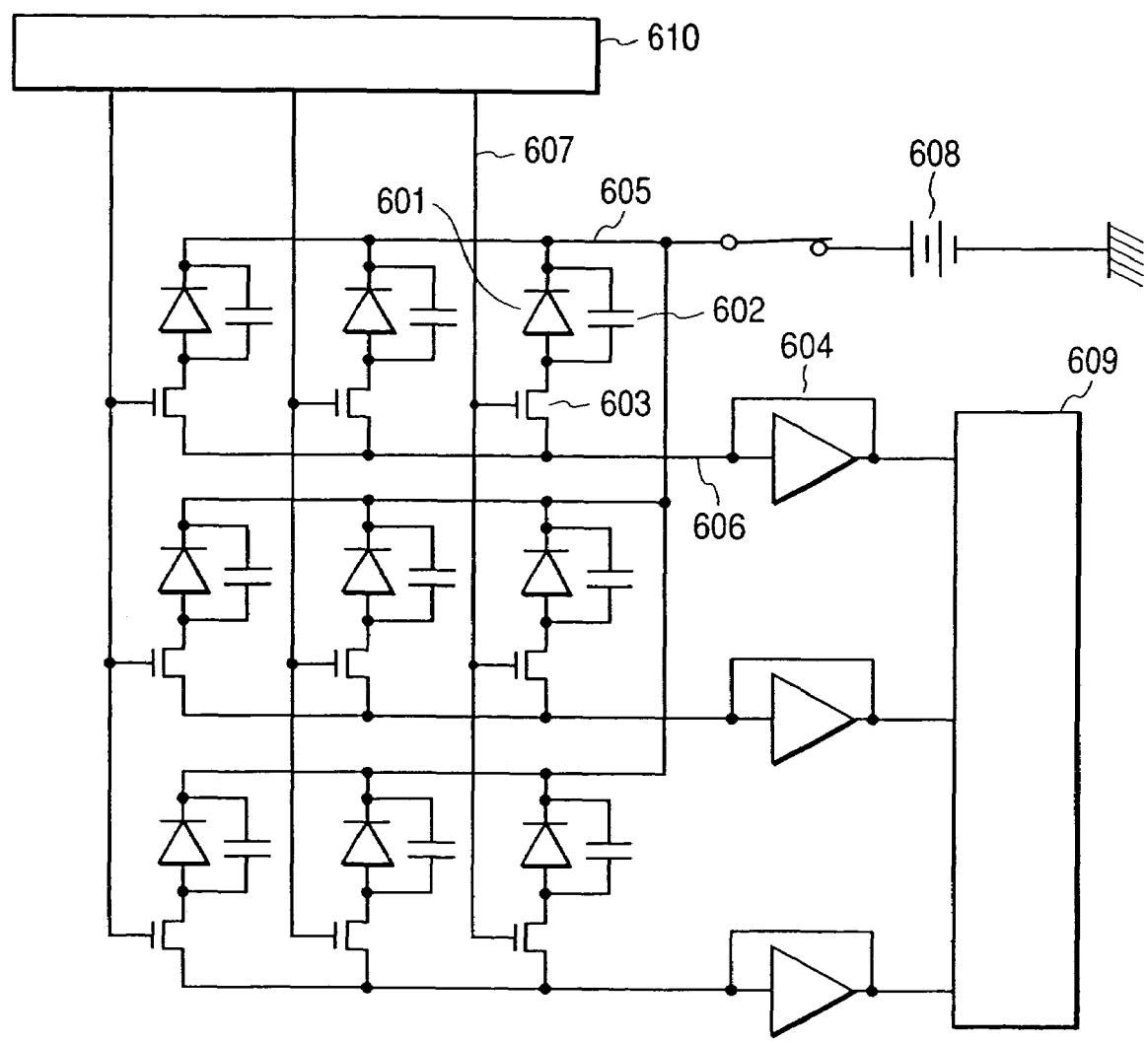
FIG. 18 is an equivalent circuit diagram of a photoelectric conversion unit with PIN type photosensors.

FIG. 18 is an equivalent circuit diagram of the photoelectric conversion unit 102 having PIN photosensors. In FIG. 18, reference numeral 601 represents a PIN photodiode, reference numeral 602 represents a capacitor, and reference numerals 603 to 610 represent components similar to those 503 to 510 shown in FIG. 17. In the photoelectric conversion unit 102 shown in FIG. 18, a constant reverse bias voltage is applied from the bias power supply 608 to the photodiode 601 via the bias line 605. In this state, radiation is applied and visible light converted by the phosphor layer 113 is applied to the PIN photodiode 601 to generate pairs of electrons and holes (carriers) corresponding to the visible light and store the carriers in the capacitor 602.

In this state, the gate drive unit 610 generates a control signal to turn on the gate of TFT 603 via the gate line 607. The stored electric charges flow through the signal line 606 and are amplified by the amplifier 504 to output an image signal in the manner similar to that described with FIG. 17.

A manufacture method for the radiation detector shown in FIG. 1 will be described. In this embodiment, the scintillator panel 110 and sensor panel 100 are bonded together by controlling a film thickness of adhesive material.

Figure 3A:
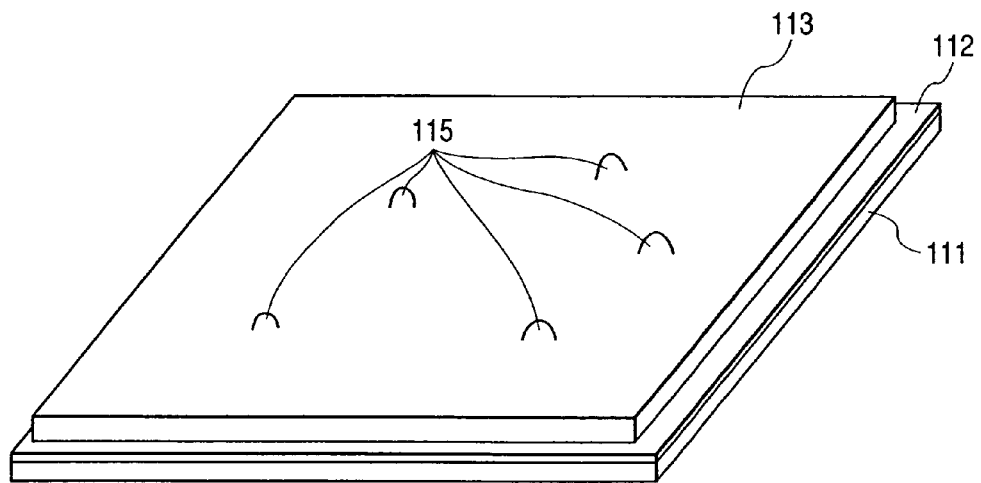
FIGS. 3A and 3B are diagrams illustrating manufacture processes for the X-ray detector shown in FIG. 1.
Figure 3B:
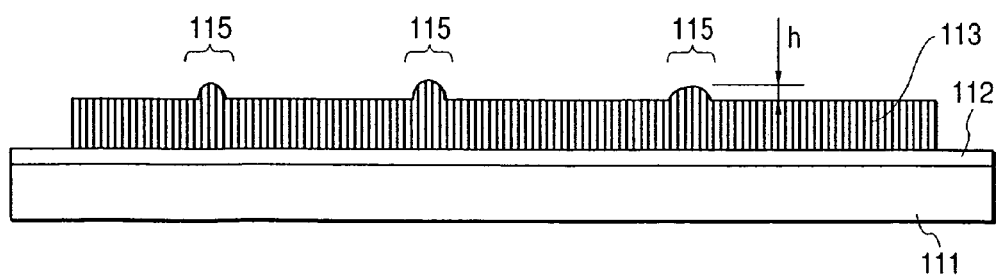

FIGS. 3A and 3B, 4A and 4B, 5A and 5B, 6A and 6B, 7A and 7B, 8A and 8B and 9A and 9B are diagrams illustrating the manufacture processes for the radiation detector shown in FIG. 1. As shown in FIGS. 3A and 3B, after a reflection layer 112 is formed on a base member 111, column-shaped phosphor is grown to form a phosphor layer 113 as a wavelength conversion member. FIG. 3A is a perspective view of the scintillator panel after the phosphor layer 113 is formed, and FIG. 3B is a cross sectional view thereof. Reference numeral 115 represents a projection of about several tens μm to several hundreds μm which is partially formed, while the phosphor layer 113 is crystallized in a column-shape, by abnormal growth to be caused by dusts, splashes during evaporation, irregular surfaces of the base member 111 or the like.

This projection is often formed by abnormal growth of crystal by using dusts or the like as growth nuclei, while the column-shape phosphor is vapor deposited. The height of the projection 115 ranges from about 10 μm low to about 100 to 200 μm high.

As described earlier, the thickness of the adhesive layer is set to 50 μm at a maximum and preferably to 20 μm or thinner in order to narrow the gap while the resolution response and CTF are taken into consideration. To this end, the projection 115 is removed. If abnormal growth of the phosphor layer 113 does not occur, the surface roughness is about several μm which does not lower the resolution.

Figure 4A:
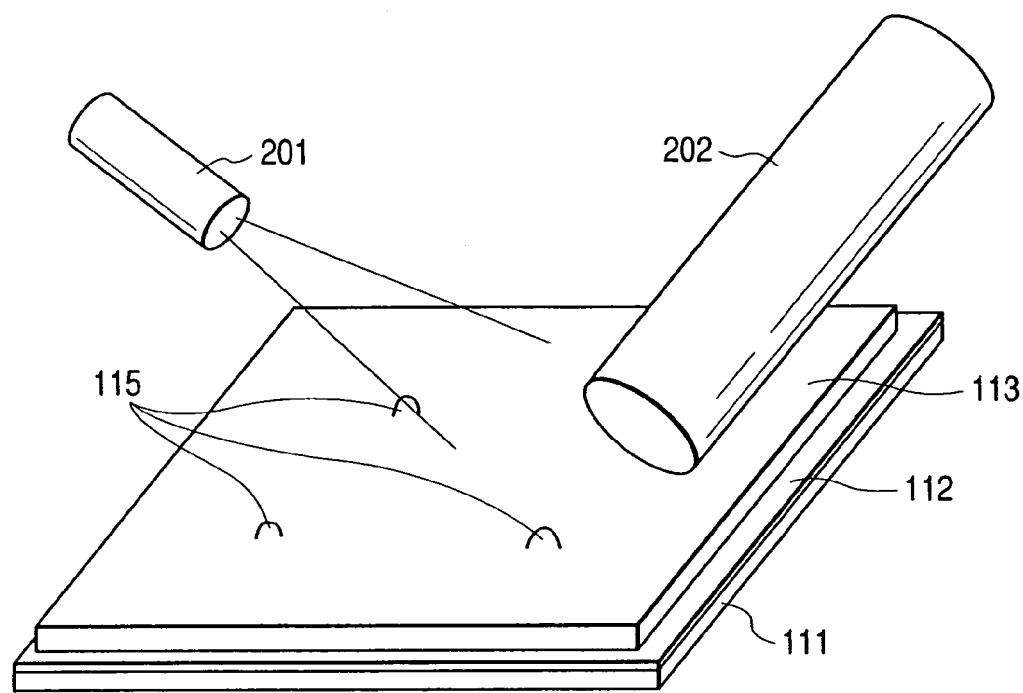
FIGS. 4A and 4B are diagrams illustrating manufacture processes for the X-ray detector shown in FIG. 1.

In removing the projection 115, first as shown in FIG. 4A, the position of the projection 115 is determined with a sensor 201 while light is obliquely applied from a light source 202 to the whole surface of the phosphor layer 113. More specifically, a signal detected with the sensor 201 is processed to form an image which has a shade if there is a projection 115. The position of each processed signal on the surface of the phosphor layer 113 is checked to locate the projection 116. In inspecting the projection, it is preferable to use a substrate inspection machine which is used for inspecting a liquid crystal panel or the like. There are mainly two types of substrate inspection machine. One type uses a combination of a light source and a line sensor. An optical image of the whole surface of a panel is read to check an abnormal contrast area through image processing. The other type uses a combination of a light source and an optical sensor which reads irregular reflection from an abnormal area. The former type can detect an abnormal area even if patterns are formed on a panel. It is preferable that this type is used for, for example, a scintillator panel having patterns such as photosensors and wiring units. The latter type is used if a panel has no pattern. However, the latter type has a small detection limit so that foreign matters of submicron level can be detected. It is preferable that this type is used if a target projection is small. A proper type is used depending upon the state of a scintillator panel.

Figure 4B:
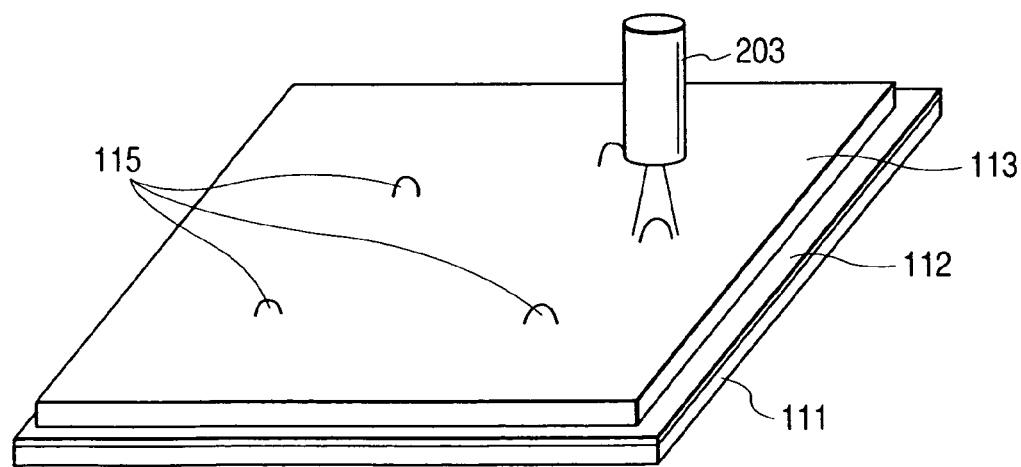
Figure 5A:
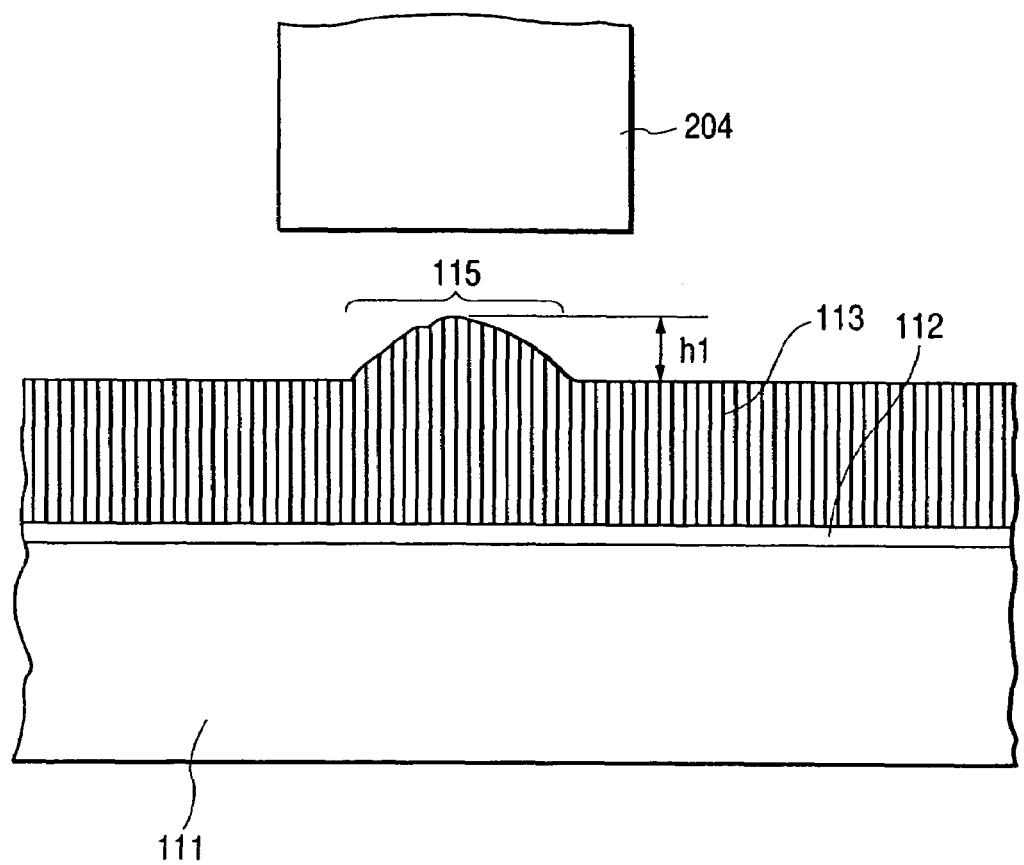
FIGS. 5A and 5B are diagrams illustrating manufacture processes for the X-ray detector shown in FIG. 1.
Figure 5B:
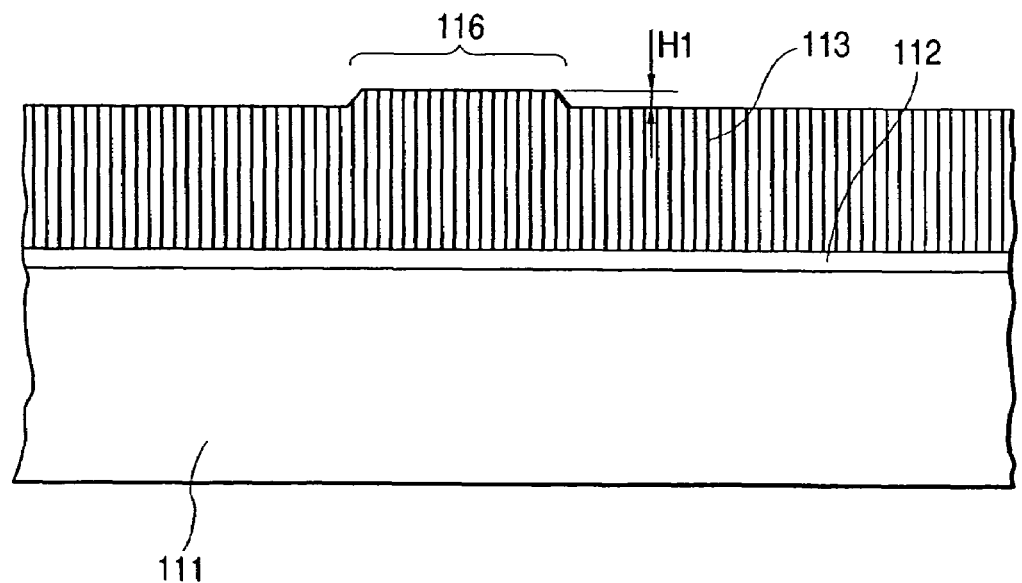

Next, as shown in FIG. 4B, the height of each projection 115 whose position was determined is measured with a microscope 203 to judge whether each projection 115 is required to be removed. More specifically, the height is read by reading a difference between focal points of the microscope 203 or by applying a laser beam to read a difference between distances. The former method has a low precision and an error of several microns. However, measurement is relatively simple and can be manually carried out. The latter method is effective if a precision of about submicrons is necessary. A comparison between measured height data and a management value can be performed by software. In order to fix a height measurement microscope to an abnormal area, an install stage is moved in accordance with the stored position data.

In this embodiment, the position and height of each projection 115 are measured by one process. Namely, immediately after the position of the projection 115 on the phosphor layer 113 is determined, the height is measured by moving the microscope 203 to the determined position.

If the projection 115 has a height greater than the thickness of the adhesion layer 120 determined from the resolution response, the material of the adhesion layer 120 and the like, it is removed, whereas if it has a height smaller than the thickness, it is not removed.

In removing the projection 115, one of the methods illustrated in FIGS. 5A and 5B, 6A and 6B and 7A and 7B is used. In the method illustrated in FIGS. 5A and 5B, a crushing jig 204 is used to crush the projection 115. In this case, a pressure is controlled in accordance with the measured height of the projection or by an unrepresented stopper mechanism, so that only the projection 115 can be crushed and the projection is not crushed too much. If the protective layer 114 is not broken, this removal process may be performed after the protective layer 114 is formed.

Figure 6A:
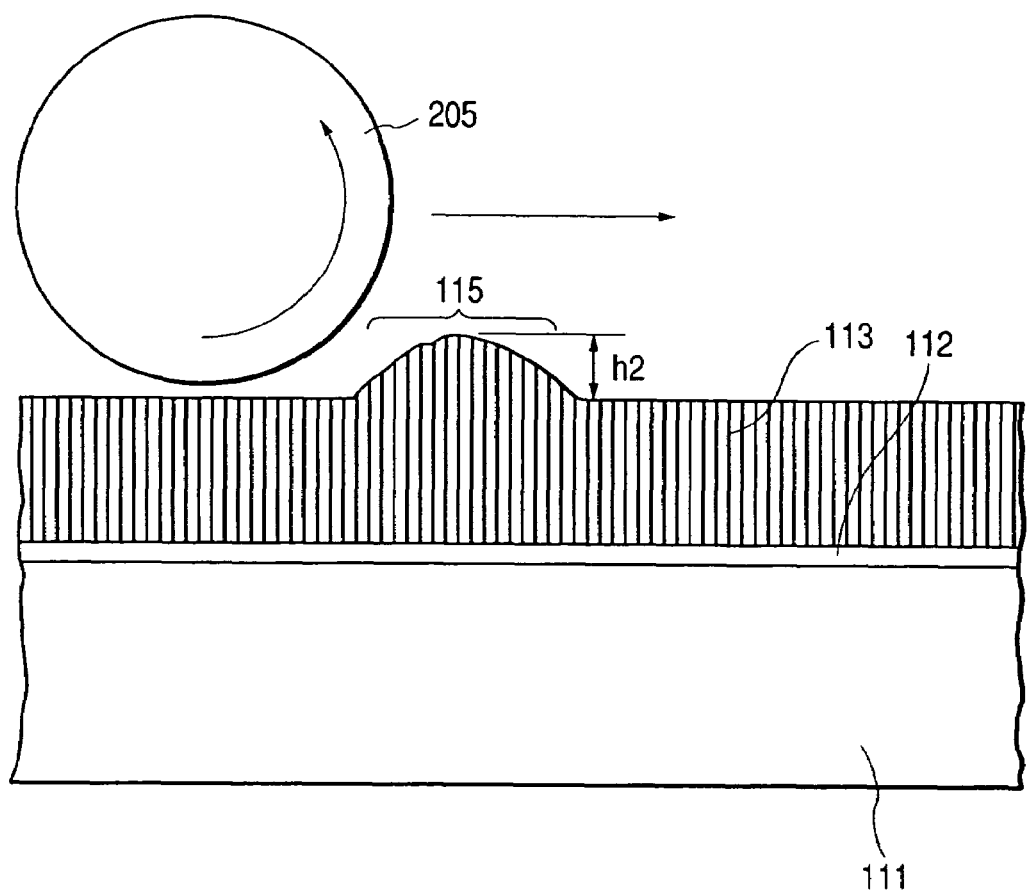
FIGS. 6A and 6B are diagrams illustrating manufacture processes for the X-ray detector shown in FIG. 1.
Figure 6B:
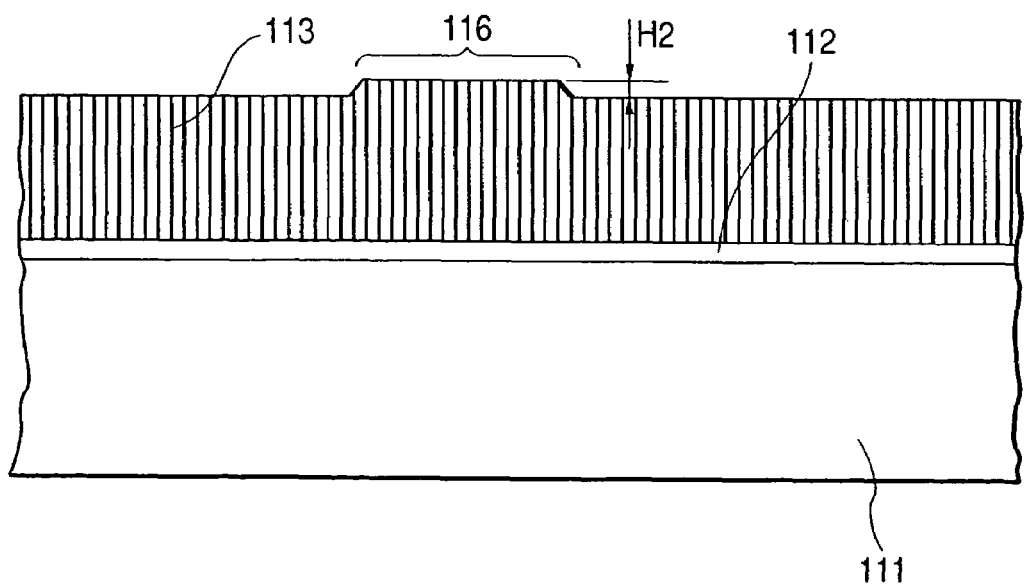

In the method illustrated in FIGS. 6A and 6B, a rotary abrading machine 205 is used to abrade the projection 115. The rotary abrading machine 205 may be provided with a suction function of sucking abraded pieces which may damage the surface of the phosphor layer 113. The rotary abrading machine 205 has either a roller rotation mechanism or a disc rotation mechanism.

Figure 7A:
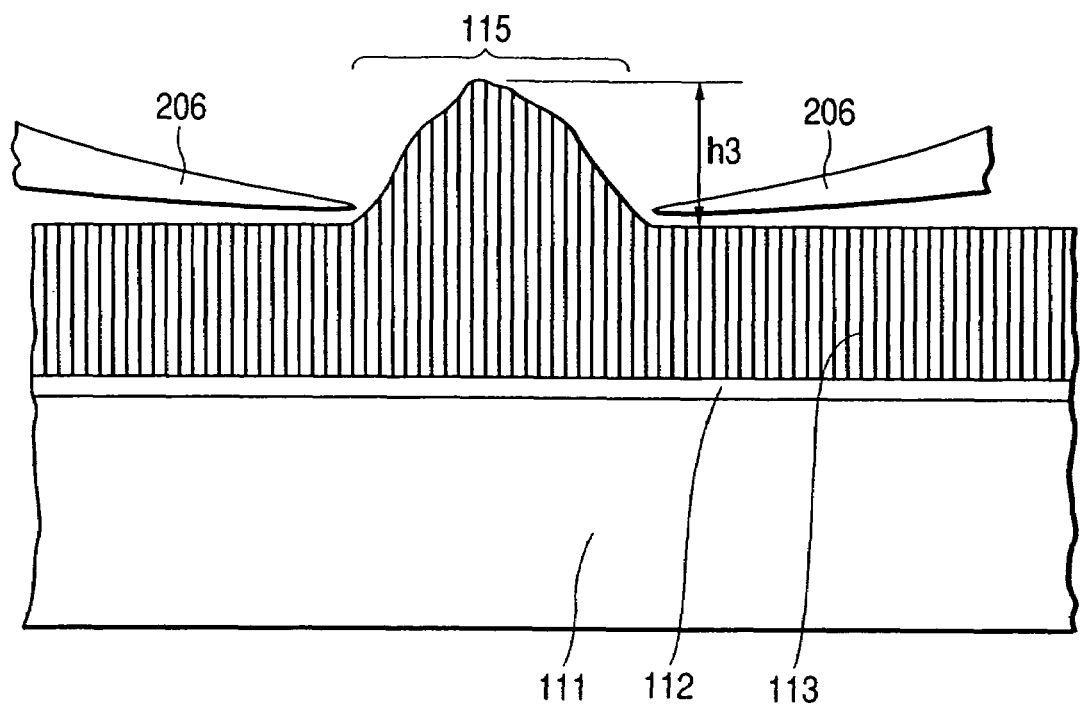
FIGS. 7A and 7B are diagrams illustrating manufacture processes for the X-ray detector shown in FIG. 1.
Figure 7B:
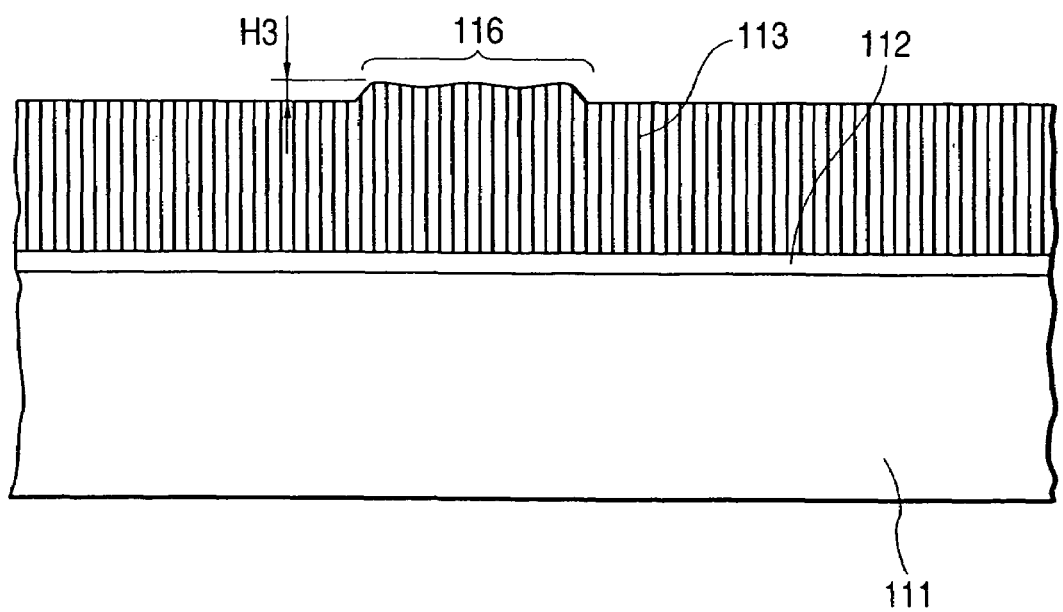

In the method illustrated in FIGS. 7A and 7B, a projection 115 is cut with a sharp cutting means 206. Also in this case, the sharp cutting means 206 may have a suction function of sucking removed pieces which may damage the surface of the phosphor layer 113.

The methods illustrated in FIGS. 6A and 6B and FIGS. 7A and 7B are preferably applied to phosphor which cannot resist against crushing. If the projection 116 is fine and long, the method illustrated in FIGS. 7A and 7B is preferable and easy to use. The method to be used is selected in accordance with the characteristics of a projection. In order to process various projections, a machine which can use all the methods may be used.

After the projection 115 is removed by any one of the methods shown in FIGS. 5A to 7B, it is checked through measurement with the microscope 203 or the like whether the surface roughness of the phosphor layer 113 is smaller than 50 µm.

If the surface roughness of the phosphor layer 113 is not smaller than 50 µm, the projection is removed by the above-described method. If the surface roughness of the phosphor layer 113 is smaller than 50 µm, a protective layer 11 is deposited on the whole phosphor to complete the scintillator panel 110 as shown in FIGS. 8A and 8B.

Figure 8A:
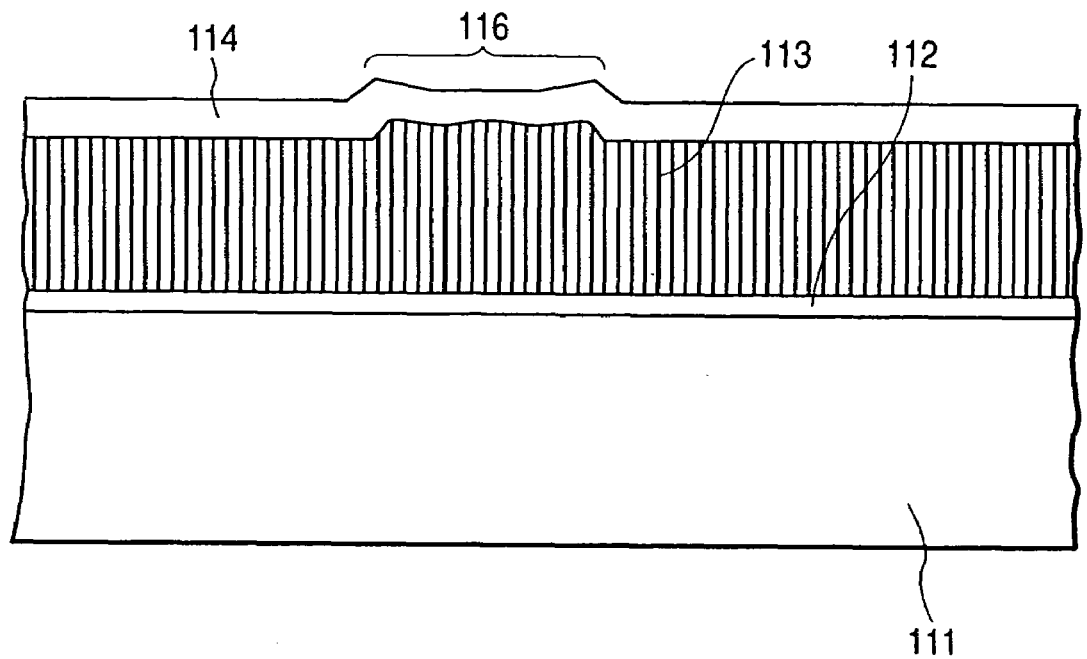
FIGS. 8A and 8B are diagrams illustrating manufacture processes for the X-ray detector shown in FIG. 1.
Figure 8B:
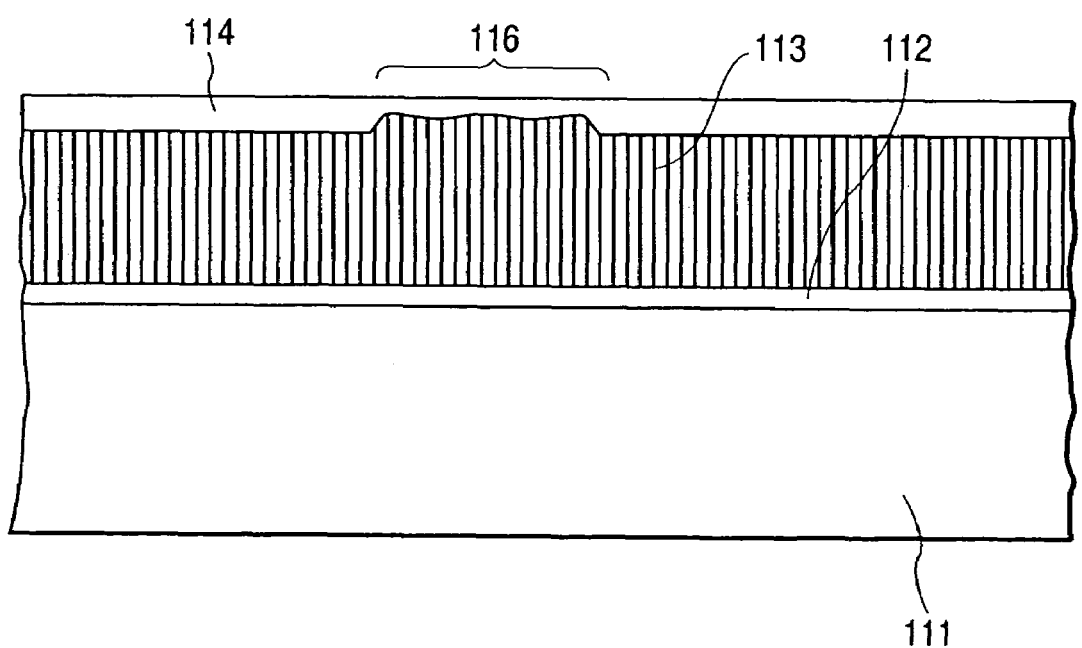

As shown in FIG. 8A, a step formed on the surface of the protective layer 114 is, if necessary, preferably planarized as shown in FIG. 8B. In order to facilitate planarization, it is preferable to form the protective film 114 through spin coating or the like of viscous material such as PI and BCB. After the protective layer 114 is formed, the surface roughness of the protective layer 114 may be inspected.

Figure 9A:
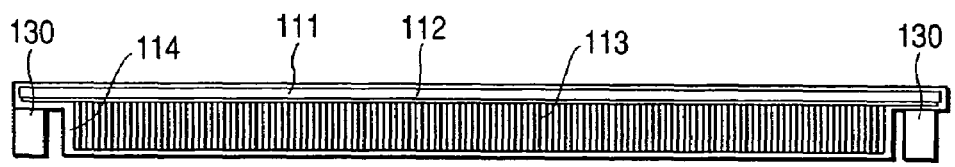
FIGS. 9A and 9B are diagrams illustrating manufacture processes for the X-ray detector shown in FIG. 1.

Next, as shown in FIG. 9A spacer 130 is formed on the outer periphery of the scintillator panel 110 to suppress a variation in thicknesses of the adhesion layer and a breakage of the ends of the phosphor layer 110 which may otherwise be caused by a weak structure of the peripheral region of the phosphor layer 110.

Figure 9B:
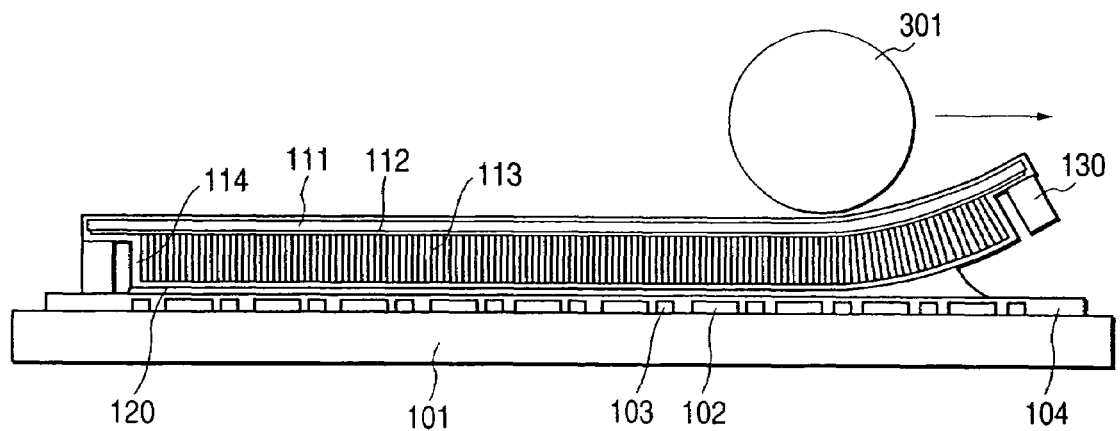
Figure 10:
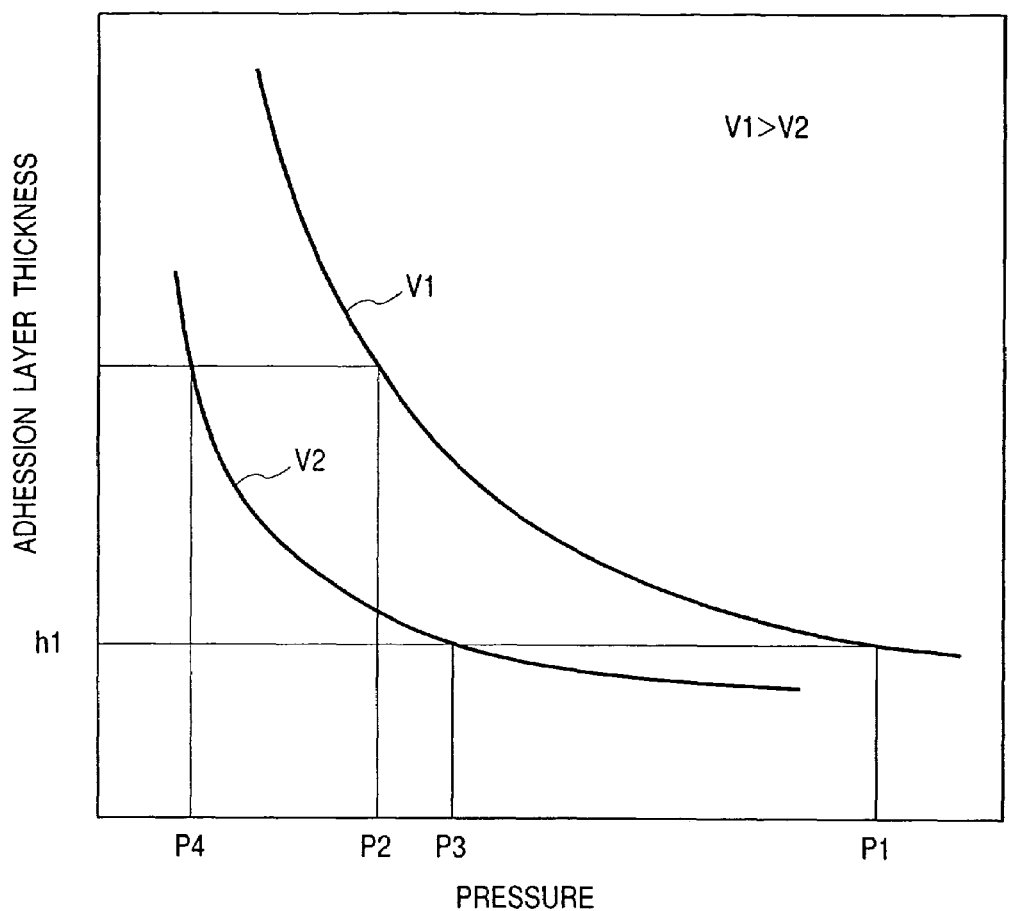
FIG. 10 is a graph showing the relation between a pressure and a thickness of an adhesion layer.

In this state, the scintillator panel 110 is placed on the sensor panel 100 coated with adhesive agent, and as shown in FIG. 9B a roller 301 is used to squeeze the scintillator and sensor panels. In this case, the pressure and squeeze speed of the roller 301 are controlled to set the thickness of the adhesion layer to 50 µm at a maximum or thinner. With this bonding by the roller 301, the adhesive layer becomes thicker as the pressure is lowered or the squeeze speed is increased, as shown in the graph of FIG. 10.

More specifically, assuming that the height of the projection 116 before bonding is hl and the squeeze speed is V1, then the pressure is set to P2 to P1. If the squeeze speed is V2, the pressure is set to P4 to P3.

With bonding by the roller 301, the adhesive layer becomes thicker the higher the rigidity of the scintillator panel 110 is. Since the film thickness becomes thinner the smaller the viscosity of adhesive agent is, the adhesive agent is required to have proper viscosity in order to control the thickness of the adhesion layer. If adhesive agent having insufficient viscosity is used, the spacer 130 is positively used to set the thickness of the adhesion layer to 50 µm at a maximum or thinner.

The bonding with the roller pushes the phosphor layer at some pressure so that the pressure is required to be precisely controlled. However, the manufacture yield is high.

A gap may be formed between the sensor panel 100 and scintillator panel 110 to flow adhesive agent between the panels 100 and 110, or pressure sensitive adhesive agent may be used to bond the panels 100 and 110.

With the former method, two objects to be bonded are sucked to two level standards and a gap for the adhesion layer is preset to thereafter flow low viscosity adhesive agent by utilizing a pressure difference. In order to determine a gap, a stopper mechanism may be provided on the bonding system side or the spacer 130 may be used between the two objects to be bonded. This method provides the smallest mechanical shock and is suitable for the objects having a weak mechanical strength.

With the latter method, pressure sensitive adhesive agent is coated to a target thickness before bonding. Therefore, the control during bonding is easy. For example, a balloon expanding through a pressure difference may be used to press the panels or the roller described earlier may be used.

As described so far, the surface of the phosphor layer 113 of the radiation detector shown in FIG. 1 has a projection 115 having a height of 50 µm at a maximum. Therefore, the photoelectric conversion unit 102 or the like will not be broken and the resolution of a digital image will not be lowered. Since the protective layer is formed after the projection is made small, it is possible to cover the whole surface of the scintillator panel as the wavelength conversion member with the protective layer and to elongate the durability.

Second Embodiment

Figure 11:
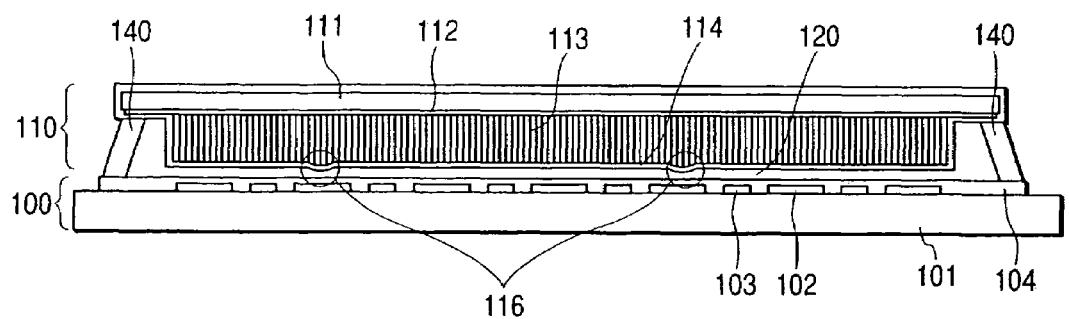
FIG. 11 is a schematic cross sectional view of an X-ray detector according to a second embodiment of the invention.

FIG. 11 is a schematic cross sectional view of a radiation detector according to the second embodiment. In this embodiment, a sealing member 140 is used in place of the spacer 130 shown in FIG. 1.

Figure 12:
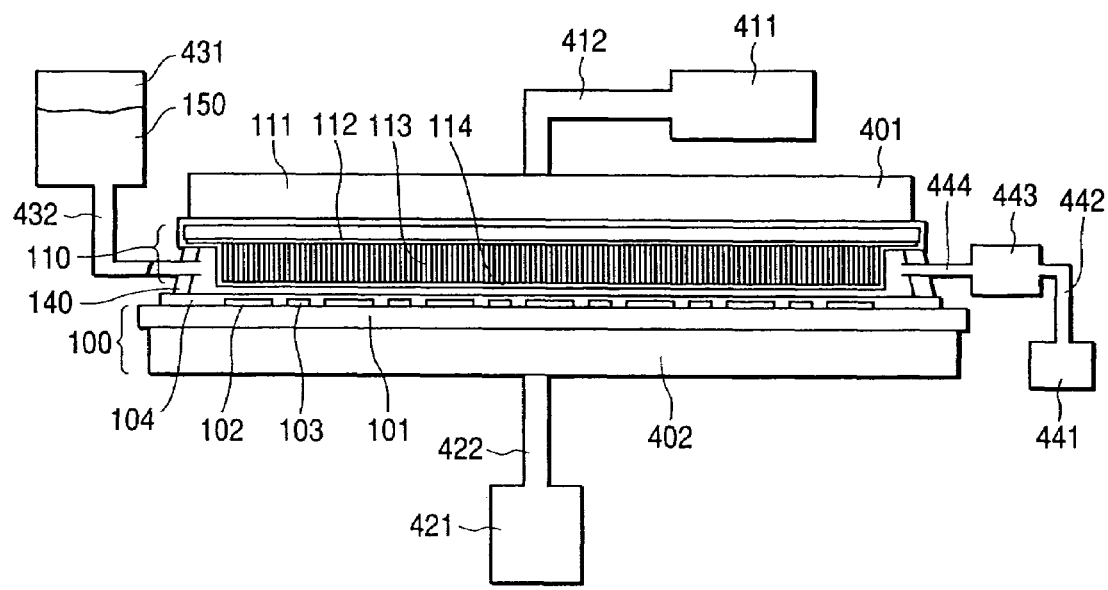
FIG. 12 is a schematic cross sectional view of a manufacture system for the X-ray detector shown in FIG. 11.

FIG. 12 shows a bonding machine for bonding a scintillator panel 110 and a sensor panel 100 of the radiation detector shown in FIG. 11. In operation of the bonding machine shown in FIG. 12, the scintillator panel 110 is made in contact with a base plate 401 and the inside of the base plate 401 is evacuated by a pump 412 via a vacuum pipe 411 to a pressure lower than the atmospheric pressure to thereby make the base plate 401 hold the scintillator panel 110.

Similarly, the sensor panel 100 is made in contact with a base plate 402 and the inside of the base plate 402 is evacuated by a pump 421 via a vacuum pipe 422 to a pressure lower than the atmospheric pressure to thereby make the base plate 402 hold the sensor panel 100.

A gap adjusting means for adjusting the gap between the base plates 401 and 402 may be provided on the bonding machine or between the base member 111 and 101 and substrate 101 to thereby adjust the gap between the adhesion surfaces. The gap size is set to have the height of the projection 116 or larger. Before this state is set, the surfaces of the base plates 401 and 402 are cleaned so that dusts are not sandwiched between chuck surfaces.

In this state, the sealing member 140 is coated on the circumference area of the radiation detector and hardened. To this end, the inlet ports of an adhesive agent supply pipe 432 and a vacuum pipe 444 are mounted on the bonding machine at proper positions. An adhesive agent tank 431 is filled with adhesive agent 150 before hardening. The adhesive agent 150 is flowed in the gap by evacuating the inside of the radiation detector by a vacuum pump 441 via vacuum pipes 442 and 444.

In order for unnecessary adhesive agent 150 not to flow into the vacuum pump 441, a buffer tank 443 is provided between the vacuum pipe 444 and vacuum pump 441 to capture the unnecessary adhesive agent.

The adhesive agent has preferably good fluidity and low viscosity. After the adhesive agent is filled uniformly in the gap between the phosphor layer 110 and sensor panel 100, evacuation is terminated and the adhesive agent supply pipe 432 and vacuum pipe 444 are removed. Holes in the sealing member 140 are filled with the same sealing agent as the sealing member 140 which is then hardened.

The radiation detector is maintained chucked by the base plates 401 and 402 until the adhesive agent 150 is hardened, in order to make the adhesion layer have a predetermined gap size. After the adhesive agent 150 is sufficiently hardened, the vacuum state in the base plates 401 and 402 is released to dismount the radiation detector.

With this bonding process, an impact between the scintillator panel 110 and sensor panel 100 given when the panels are bonded can be relaxed more than the first embodiment. This process is therefore effective for bonding the panels having a weak structure.

Third Embodiment

Figure 13:
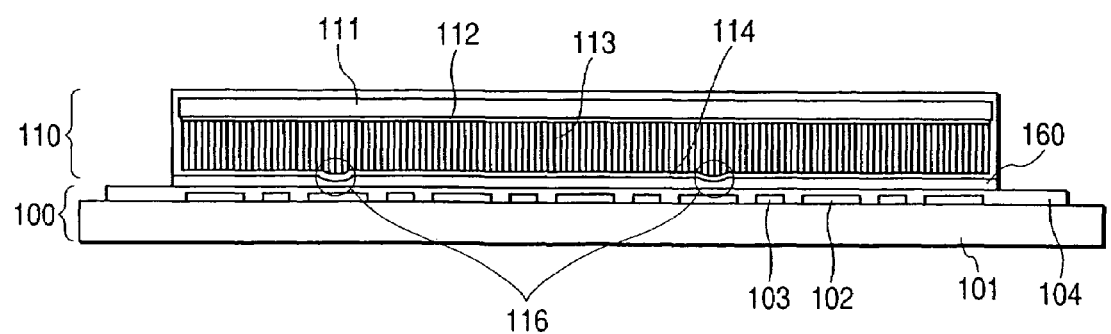
FIG. 13 is a schematic cross sectional view of an X-ray detector according to a third embodiment of the invention.

FIG. 13 is a schematic cross sectional view of a radiation detector according to the third embodiment. In this embodiment, a scintillator panel 110 and a sensor panel 100 are bonded together by paste-like pressure sensitive adhesive agent 160.

Figure 14A:
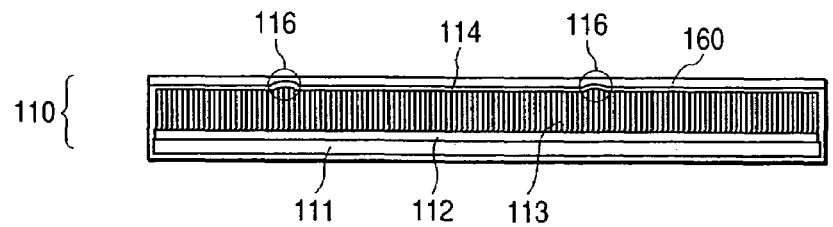
FIGS. 14A and 14B are cross sectional views illustrating a bonding process for the X-ray detector shown in FIG. 13.
Figure 14B:
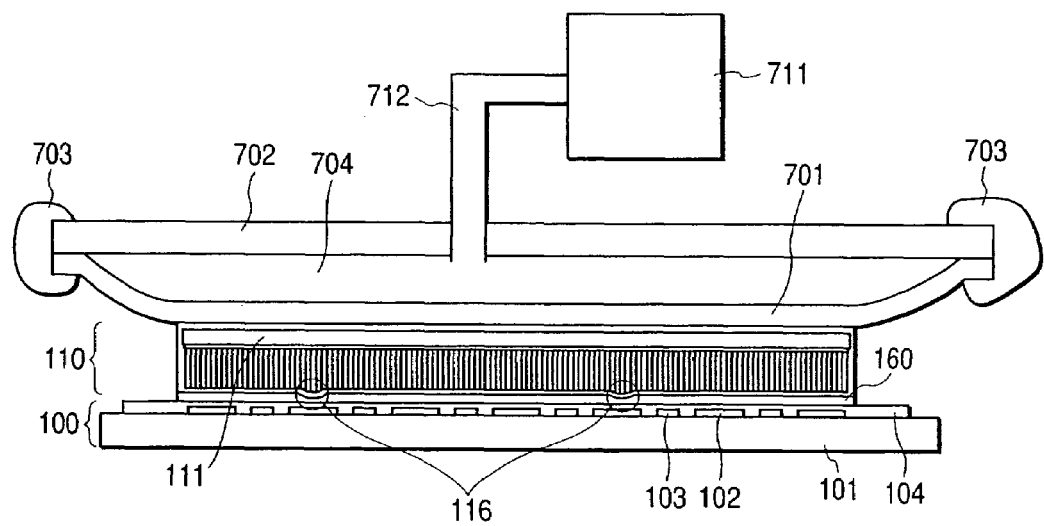
Figure 15:
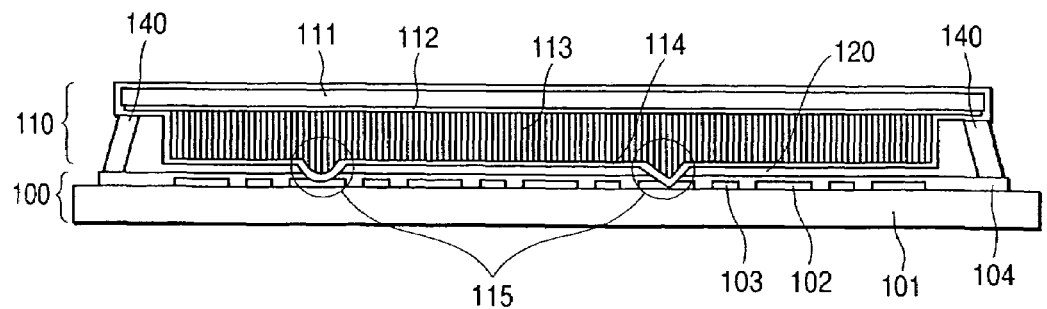
FIG. 15 is a schematic cross sectional view of an X-ray detector whose phosphor layer has projections on the surface thereof.
Figure 16A:
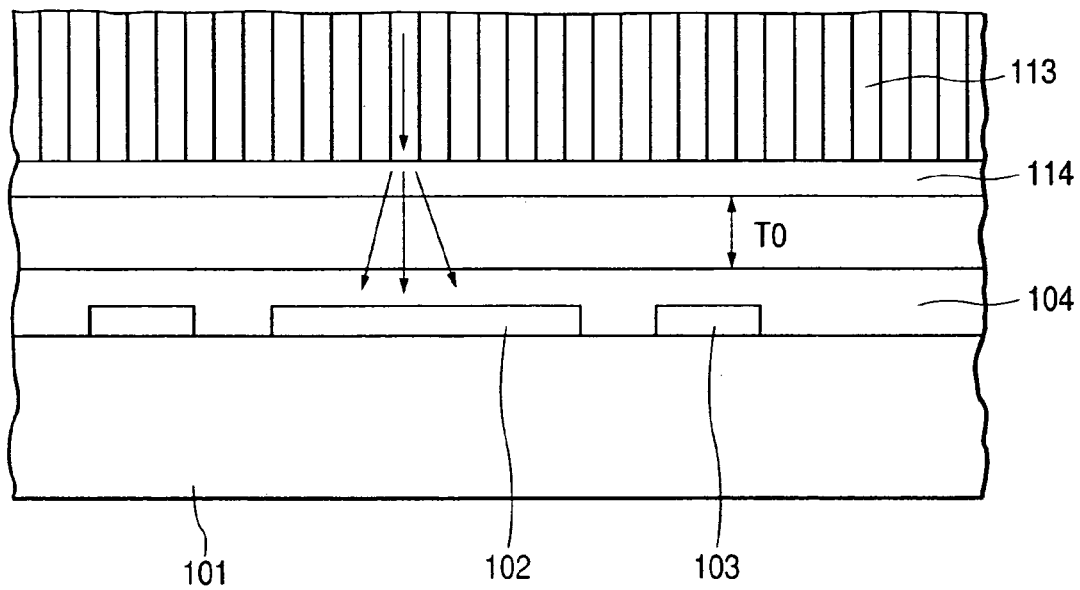
FIGS. 16A and 16B are enlarged views of X-ray detectors with and without projections.
Figure 16B:
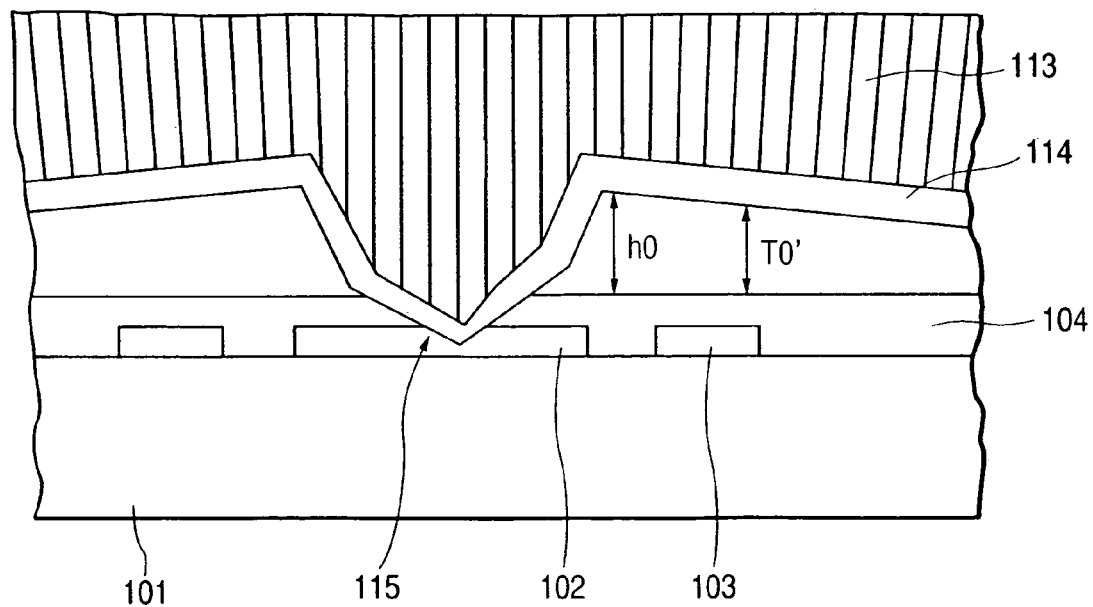

FIGS. 14A and 14B are cross sectional views illustrating a bonding process for the radiation detector shown in FIG. 13. FIG. 14A is a cross sectional view showing the scintillator panel coated with the pressure sensitive adhesive agent 160, and FIG. 14B is a schematic diagram showing the structure of a bonding machine for bonding the scintillator panel 110 and sensor panel 100 of the radiation detector shown in FIG. 13.

Pressure sensitive adhesive agent 160 is coated on the scintillator panel 110 shown in FIG. 14A by a method similar to that of the first embodiment. Since the pressure sensitive adhesive agent 160 is paste-like, the surface thereof becomes flat so that the process of changing the state, for example, shown in FIG. 8A to the state shown in FIG. 8B, is not necessary. The thickness of the pressure sensitive adhesive agent 160 is required to be equal to or higher than the projection.

The scintillator panel 110 coated with the pressure sensitive adhesive agent 160 is placed on the sensor panel 100 and pressed by a rubber balloon 701 to bond them together.

Compressed air is supplied via a pipe 712 from a compressor 711 to a space 704 between the rubber balloon 701 and a lid 702 sealed with sealing members 703. The inner pressure is therefore raised to expand the rubber balloon 701.

If the compressor 711 is not used, nitrogen gas available in the factory may be used to supply compressed air, or another safe compressed air may be used. As shown in FIG. 14B, the rubber balloon 701 starts pressing the base member 111 gradually from the central area of the phosphor layer 110 to the peripheral area. Therefore, an air layer between the pressure sensitive adhesive agent 160 and sensor panel 100 is expelled toward the outside so that bonding without air bubbles is possible.

Bonding impact between the pressure sensitive adhesive agent 160 and sensor panel 100 can be absorbed by the pressure sensitive adhesive agent 160, and the thickness of the adhesion layer can be controlled by the coating amount of the pressure sensitive adhesive agent 160.

Downward pressure control is easy and productivity can be improved. In this embodiment, the rubber balloon 701 is expanded by using compressed air. Instead, the whole bonding samples may be enclosed in a vacuum system to expand the rubber balloon 701 by utilizing the atmospheric pressure and press the samples to bond them together.

An air layer between the pressure sensitive adhesive agent 160 and sensor panel 100 may be expelled by using a roller as described in the first embodiment.

In each of the above-described embodiments, if the height of a projection 116 exceeds a predetermined threshold value, the projection 116 is partially removed to make its height smaller than the threshold value. Instead, the top surfaces of all projections 116 may be made parallel to the sensor plane so that the sensor is not broken upon application of an external force during the bonding process for the scintillator panel 110 and sensor panel 100.

Fourth Embodiment

In this embodiment, after a first protective film is formed, a projection on the surface of a wavelength conversion layer is removed or made small, and thereafter a second protective film is formed. The details of this structure will be given below.

Figure 20A:
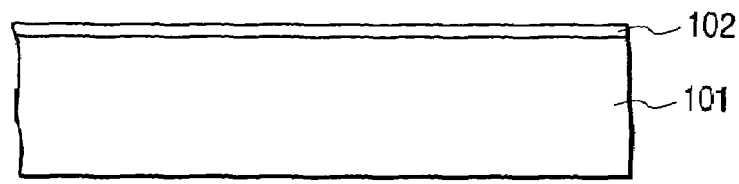
FIGS. 20A, 20B, 20C, and 20D are schematic cross sectional views illustrating manufacture processes for a scintillator panel.

In the above-described embodiments, the projection on the surface of a wavelength conversion member is directly made small. If CsI or the like having deliquescence is used as the material of the wavelength conversion layer, it is preferable in some cases to form a protective layer on the surface of the phosphor layer. Before the projection is made small, the protective film is first formed. As shown in FIG. 20A, a reflection layer 102 is formed on a base member 101. The reflection layer 102 reflects light in the phosphor radiated along the direction opposite to the sensor panel side to thereby efficiently detect light.

Figure 20B:
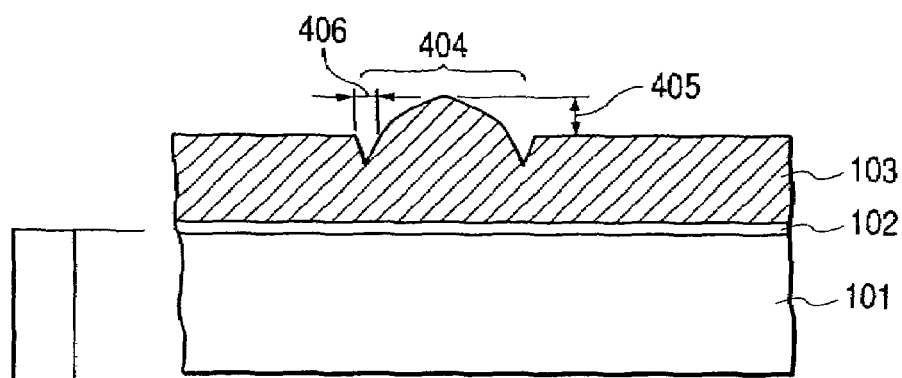

Next, as shown in FIG. 20B, on the reflection layer 102 formed on the base member 101, a phosphor 103 as a wavelength conversion member is formed. The mechanism of forming a projection on the surface of the phosphor layer of CsI as the wavelength conversion member will be detailed.

The base member 101 formed with the reflection layer 102 is set in a vacuum vessel, and deposition source CsI ($Na^+$) or CsI ($Tl^+$) is filled in a port. The pressure in the vacuum vessel is lowered to 0.1 to 1.0 Pa, and the base member 101 formed with the reflection layer 102 is heated to a high temperature (about 100 to 180° C.). Current is flowed in the pot to heat it. CsI is evaporated and CsI column-shape crystals are formed on the base member 101 formed with the reflection layer 102.

In this case, CsI may fly into the vacuum vessel before CsI is perfectly evaporated (in a solid state). This rigid substance may be attached to the deposition surface of the base member 101 formed with the reflection layer 102. This rigid substance is called a splash.

The CsI splash changes to a projection on the deposition surface as shown in FIG. 20B. The projection has a size (diameter) 404 of about several tens to several hundreds μm and a height 405 of about several tens to one hundred and several tens μm. As shown in FIG. 20B, near the projection, a recess is formed in some cases which has a gap width 406 of several to several tens μm and a depth of several tens to several hundreds μm. These projection and recess may be formed by foreign matters attached to the base member 101 formed on the reflection layer before, during or after deposition.

If the phosphor 103 is made thick, the deposition time prolongs correspondingly so that such projections become likely to be formed. If the deposition area is made broad, an occurrence frequency of projections becomes large.

Figure 20C:
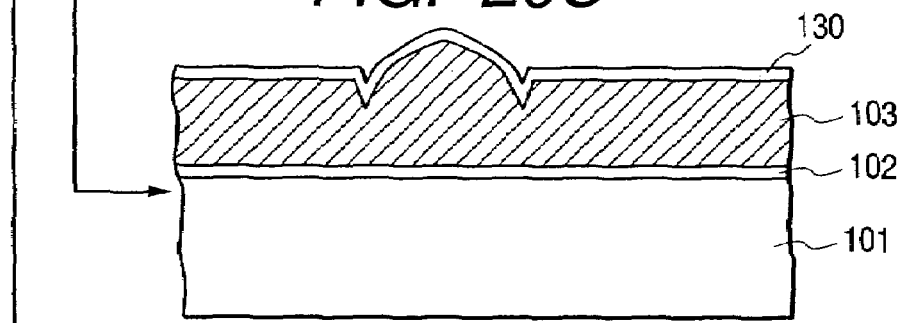
Figure 20D:
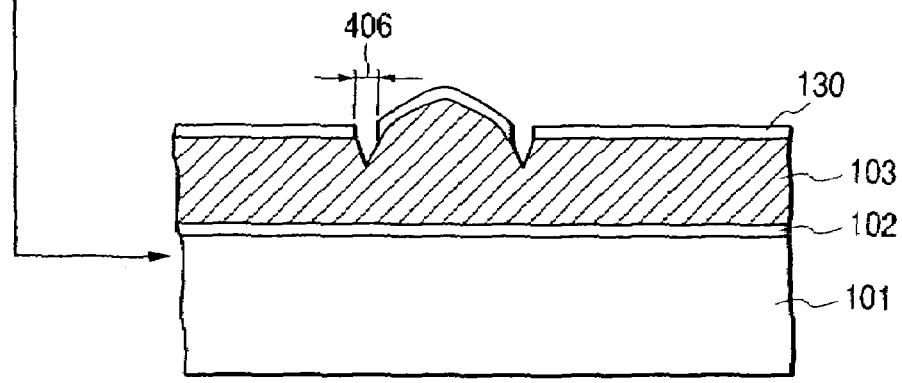

Next, as shown in FIG. 20C or 20D, a protective film 130 is formed on the upper surface or whole surface of the phosphor 103 in order to protect the phosphor layer from mechanical stress and moisture. The protective layer 130 exists between the phosphor and sensor panel after bonding. Therefore, the protective layer 130 is preferably made of material having a high light transmittance and made thin. If the transmittance is low, light radiated in the phosphor layer 103 is absorbed in the protective layer 130 and the amount of light incident upon the sensor panel reduces. If the protective layer 130 is thick, the distance between the phosphor and sensor panel becomes long so that light from the phosphor 103 is scattered so that the resolution of the sensor panel lowers. If CsI having deliquescence is used as the material of the phosphor layer 103, the protective layer is preferably made of low moisture permeability material capable of protecting the layer from moisture. For example, polyparaxylylene resin or the like satisfies the above-described conditions.

As shown in FIG. 20C, as the phosphor 103 of CsI is formed by evaporation, projections having a height of several tens to one hundred and several tens μm and recesses may be formed because of the presence of splashes or foreign matters. Since the protective film is preferably as thin as several tens to ten and several μm, the projections and recesses having the similar size to that before the protective layer 130 is formed film may appear after the protective layer 130 is formed.

As shown in FIG. 20D, since the recess around the projection has a gap of several to several tens μm, the protective film may not be formed or a thinner protective film 130 may be formed. The gap cannot be filled with the protective film unless a protective film having a thickness corresponding to the gap depth is formed. If the protective film having a thickness of several tens μm is formed, the resolution lowers.

The scintillator panel having the reflection layer 102, phosphor layer 103 and protective layer 130 formed on the base member 101 is bonded to the sensor panel by using adhesive agent to complete a radiation detector. As the scintillator panel is bonded to the sensor panel 111 by using adhesive agent 115, the protective layer 130 is positioned between the phosphor layer 103 and sensor panel 111, similar to the adhesive agent 115. Therefore, the light transmittance and film thickness of the protective layer 130 become important issues.

Figure 21A:
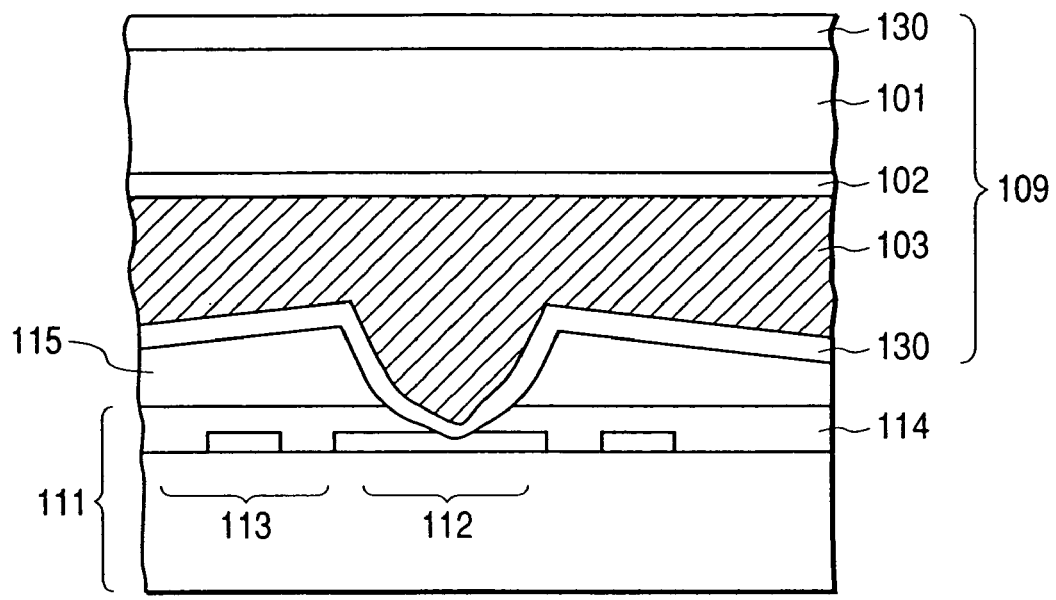
FIGS. 21A and 21B are cross sectional views illustrating a problem to be caused by a projection of a phosphor.
Figure 21B:
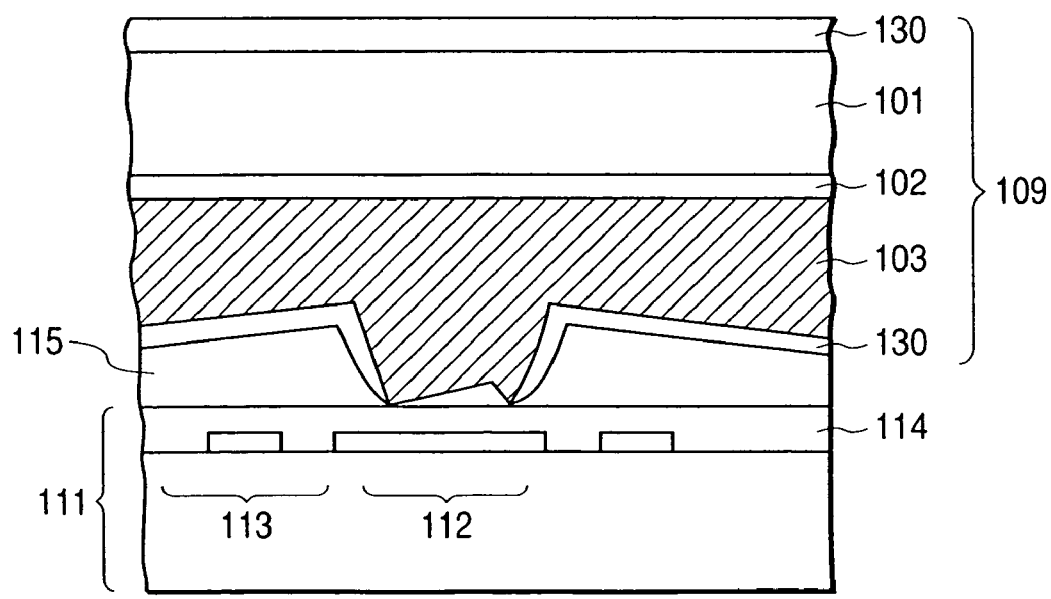

As described above, as the phosphor of particularly CsI of a scintillator panel is formed by evaporation, many projections and recesses having a size of several tens to one hundred and several tens μm may be formed because of the presence of splashes or foreign matters. After the scintillator panel and sensor panel are bonded, these projection and recess may break the sensor unit as shown in FIG. 21A or may break the protective layer as shown in FIG. 21B. A load of a roller during bonding is concentrated on the projection on the surface of the scintillator panel so that the phosphor layer 103 and protective layer 130 near the projection are crushed. Cracks are therefore formed in the protective film 130.

The recess may not be covered partially with the protective film 130 to expose the phosphor layer 103. During the temperature and moisture durability test, moisture may enter from cracks or the recess not covered with the protective film and the phosphor layer 103 may be corroded. If the phosphor layer 103 is made of CsI, it may be deliquesced.

The projection and recess of the scintillator panel 109 may not only break the protective layer 130 and sensor panel 111 but also contain air bubbles during bonding. The reason for this is as follows. If a number of projections are formed on the surface of the scintillator panel 109, the load of a roller is concentrated on the projections and is not applied uniformly to the adhesive agent 115 so that the adhesive agent 115 becomes hard to be spread.

Even if the number of projections is small, an area near the projection is not applied with the load so that air bubbles cannot be expelled. Since air bubbles are left between the scintillator panel 109 and sensor panel 111, light radiated in the phosphor 103 is irregularly reflected which may lower the resolution.

In this embodiment, the first protective film is formed on the surface of the phosphor layer with projections. After the projections under the first protective layer are crushed or removed, a second protective film is formed on the first protective film to reduce the phosphor surface area which is not covered with the protective film.

When the surface of the phosphor layer of CsI having deliquescence is planarized before a protective film is formed, this planarization process is required to be performed in vacuum or in $N_2$ atmosphere, which requires a dedicated system and a large cost. In order to avoid this, after the phosphor layer is formed, the first protective film is formed for preliminary protection to cover the upper surface or whole surface of the phosphor layer including the surface of the base member. Thereafter, the phosphor layer and the protective film are planarized and then the second protective film is formed. Since the area around the projection is also covered with the protective layer, the durability of the phosphor layer can be further improved.

The planarizing process may be the planarizing process of the above-described embodiments.

Figure 22A:
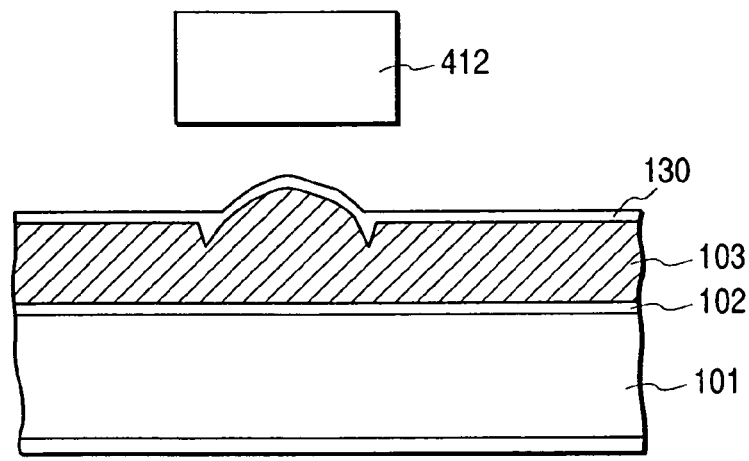
FIGS. 22A, 22B and 22C are cross sectional views illustrating a method of planarizing a projection of a phosphor.

FIG. 22A is a cross sectional view illustrating an example of the planarizing process of crushing the projection and recess on the surface of a phosphor layer. As the means for crushing, a flat plate or a roller may be used. In the example shown in FIG. 22A, a flat plate 412 is used. If the pressure is too strong, the area around the projection is also applied with some pressure and there is a possibility that the peripheral phosphor may be broken. In order to avoid this, a stopper for controlling a pressure may be provided or a mechanism such as a push-pull gauge capable of measuring a load may be provided. The scintillator panel with the protective layer being set downward may be placed on a flat plate (such as a level block) and a roller is rolled on the scintillator panel to planarize all projections at the same time.

Figure 22B:
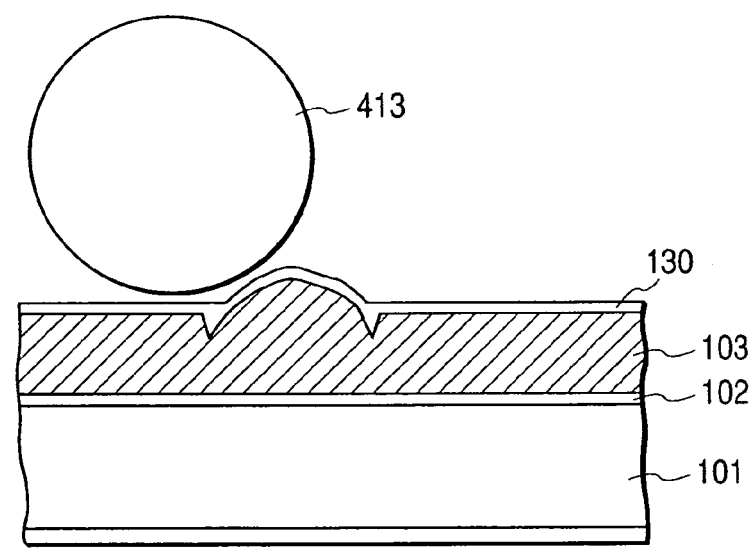

FIG. 22B is a cross sectional view showing an example of the planarizing process of scraping a projection. In this example, a disc file 413 is rotated to scrape and planarize the projection. This process is preferably used for a phosphor which cannot resist against a crushing force. However, there is a problem that scraped pieces are formed.

Figure 22C:
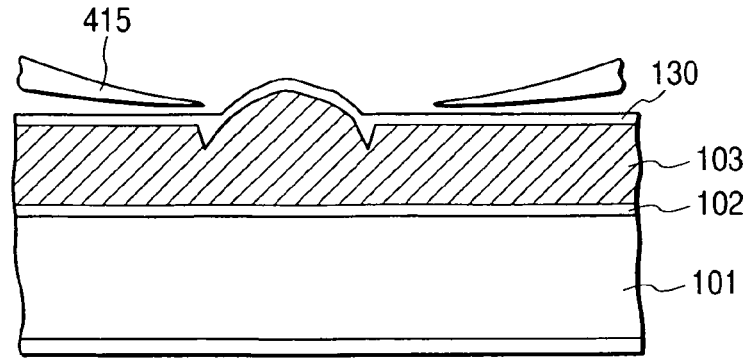

FIG. 22C is a cross sectional view illustrating the planarizing process of cutting off a projection. The projection is cut off by opposing blades 415 such as a nail clipper to planarize the projection. This process is effective for cutting a projection having a large height.

A laser process is suitable for fine processing and can work in a micron order. The laser process is used practically in semiconductor manufacture processes. The work precision is dependent upon parameters such as a laser exposure time and a pulse width and the kind of laser. There are a YAG laser having a long wavelength and a excimer laser having a short wavelength. An efficient work can be performed by selecting the kind of laser in accordance with the shape of a projection and a mode (splash, foreign matter). Projections can be planarized automatically in cooperation with a substrate inspection machine.

Figure 23A:
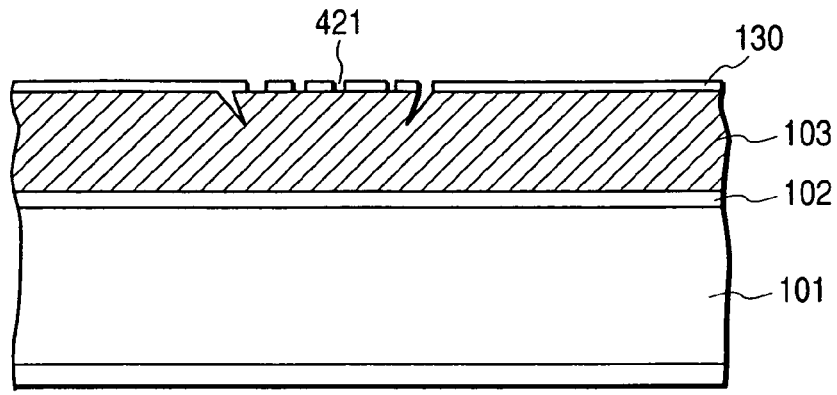
FIGS. 23A, 23B and 23C are cross sectional views of phosphors after a projection was planarized.
Figure 23B:
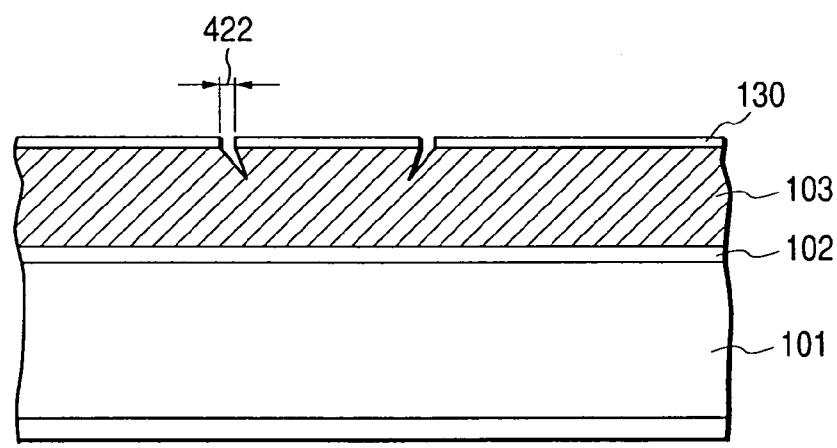
Figure 23C:
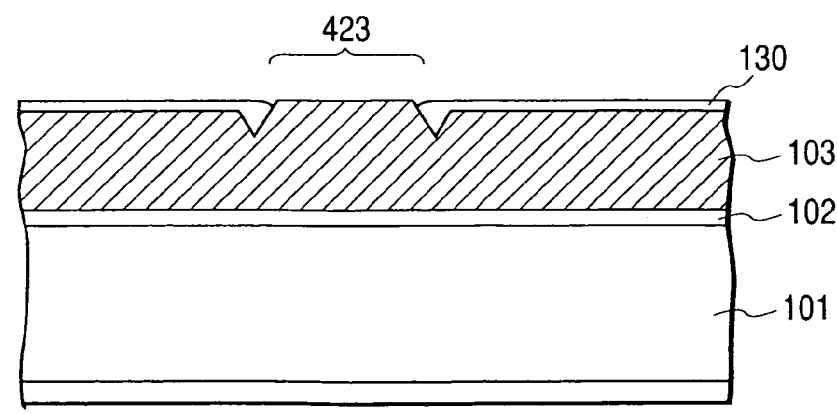

FIGS. 23A to 23C are cross sectional views showing the scintillator panels after the planarizing process. FIGS. 23A and 23B show the scintillator panels after the planarizing process of crushing. As shown in FIG. 23A, a number of cracks 421 of about several to ten and several μm exist in some cases. These cracks are often formed if the projection is about several hundreds µm.

FIG. 23B shows the scintillator panel whose projection is crushed under the conditions that the protective layer is not formed on the recess around the projection as shown in FIG. 20D. The gap 406 shown in FIG. 20D is pressed by the projection and extends in a lateral direction so that the gap 406 is changed to a narrow gap 422 shown in FIG. 23B. For example, a gap of about 250 µm before crushing was narrowed to about 4 µm by crushing. The projection used had a diameter of about 250 µm and a height of about 40 µm. FIG. 23C shows the scintillator panel whose projection is scraped or cut off. As shown in FIG. 23C, the scraped phosphor 103 is exposed as shown at 423.

Next, the second protective layer to be formed on a scintillator panel whose projection was planarized will be described. Since the second protective layer is formed between the phosphor and sensor panel, the material conditions same as those of the first protective layer (layer formed immediately after the phosphor is formed) are required.

(1) Light Transmittance

It is preferable to use material having a transmittance of about 80% or larger at a wavelength $\lambda \approx 400$ to 700 nm in order not to absorb light radiated in the phosphor.

(2) Thickness

It is preferable that the total thickness including the first protective film is 20 µm or thinner. If the total thickness is thicker than 20 µm, the resolution lowers considerably.

(3) Moisture Permeability

Moisture resistance varies from one phosphor to another. CsI in particular has weak moisture resistance and deliquescence. If CsI is used as the material of phosphor, it is preferable to use CsI having 2.0 g/24 h (ASTME96-63T) or smaller in order to improve reliability.

(4) Wettability

Since the second protective layer has a surface bonded to the sensor panel via the adhesive agent, the material having a good wettability is preferable. It is effective in some cases to improve wettability by performing a plasma process or a corona discharge process.

(5) Affinity with Phosphor

Since the second protective film contacts the phosphor where the first protective film is not formed, material not influencing (dissolving or the like) the phosphor is preferable.

The material satisfying the conditions (1) to (5) may be: polyparaxylylene resin (manufactured by Three Bond Company, Ltd., product name: Parlylene) of olefin resin, particularly polyparachloroxylylene (manufactured by Three Bond Company, Ltd., product name: Parlylene C); polyimide resin; acrylic resin; epoxy resin; and the like. Thermosetting, ultraviolet hardening or the like may be used for hardening the second protective film.

The method of forming the second protective layer may be thermal CVD, plasma CVD, spin coating, dip coating, potting, spraying, coating with a brush, and the like. The second protective layer may be formed on the whole surface of the first protective film, or it may be formed only on the surface where the first protective film was removed during the planarizing process or cracks were formed. If there are several tens of projections and recesses or more on the surface of the phosphor, it is preferable to form the second protective layer on the whole surface of the phosphor. If there are several projections and recesses, the second protective film may be formed through coating with a brush or by using a dispenser. In this case, it is important to set the height (thickness) of the second protective layer to several µm to ten and several µm.

The second protective layer is formed in order to cover cracks formed during the planarizing process or the gap formed during the phosphor forming process. Both cracks and gaps have the size of several µm to ten and several µm after the planarizing process. In order to cover these cracks and gaps, the second protective layer having a thickness of several µm to ten and several µm is formed. Similar to the first to third embodiments, it is preferable to set the height of a projection after the planarizing process to 50 µm or lower. With the planarizing process and the second protective layer, cracks and gaps having a width of several tens µm are buried so that the moisture proof of CsI in the projections and recesses can be further improved.

Fifth Embodiment

FIGS. 24A to 24D are cross sectional views of a scintillator panel and the radiation detector according to the fifth embodiment. An amorphous carbon plate (a-C) was used as the base member 101, aluminum (Al) was used as the material of the reflection layer 102, caesium iodide (CsI) was deposited for forming the phosphor 103, and Parlylene was used as the material of the protective film 104. Projections 105 were formed because of splashes or foreign matters on the phosphor 103. If a conductive base member made of amorphous carbon is used, a protective layer may be formed between the base member and reflection layer in order to prevent corrosion of the reflection layer of Al.

A thickness of the phosphor 103 was set to about 500 µm, and a thickness of the first protective film 104 was set to about 5 µm. There were about two hundred projections 105 distributed over almost the whole surface and having a size of about 200 to 500 µm and a height of about 30 to 70 µm. The projections were measured by an active matrix substrate inspection apparatus to be used for liquid crystal panels and the like and a three-dimensional shape measuring laser apparatus. After the three-dimensional shape measuring, only the projections 105 having a height of 100 µm or higher were cut with opposing blades of a nail clipper shape.

Figure 24A:
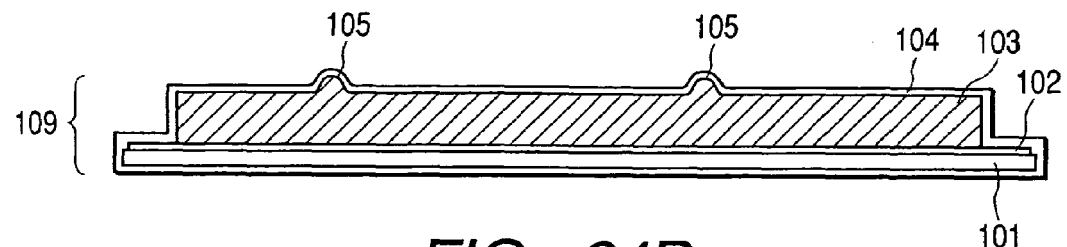
FIGS. 24A, 24B, 24C and 24D are cross sectional views illustrating a fifth embodiment of the invention.
Figure 24B:
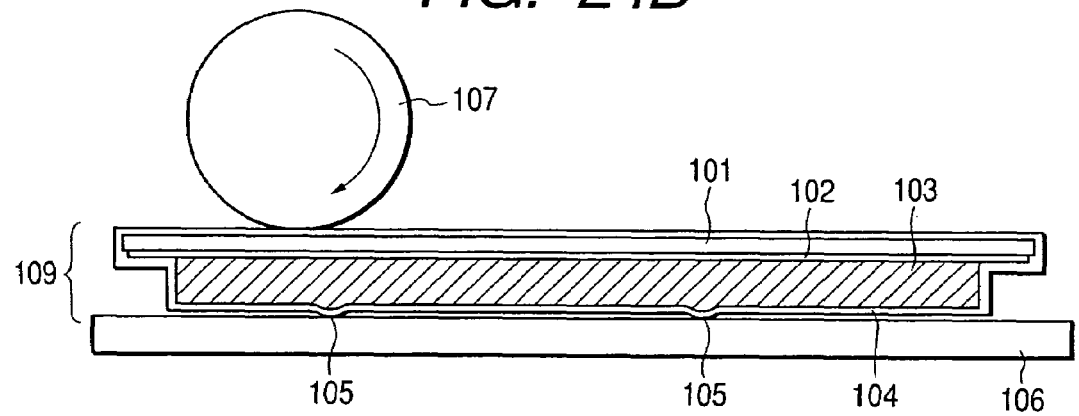

Next, as shown in FIG. 24B, the scintillator panel 109 with the phosphor 103 being set downward was placed on a level block 106 and the roller 107 was rolled on the upper surface of the scintillator panel to perform the planarizing process. This planarizing process lowered the height of the projections 105 on the phosphor 103 to about 5 to 20 µm, and narrowed the gap of recesses near the projections to about several µm. Since all the projections could be crushed at the same time by the roller 107 and level block 106, the planarizing process was possible without increasing the number of processes.

Figure 24C:
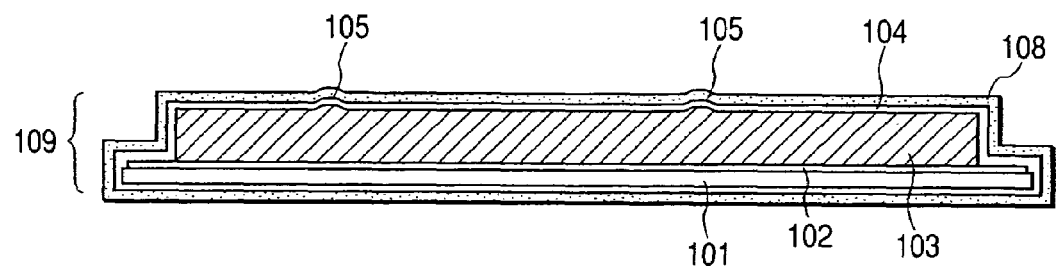

Thereafter, as shown in FIG. 24C, Parlylene the same material as the first protective film 104 was deposited on the whole surface to a thickness of about 10 µm to cover the gaps and cracks of several µm and form the second protective film 108.

The scintillator panel 109 with the second protective film 108 of Parlylene after the planarizing process was subjected to a temperature and moisture durability test (conditions: 55° C., 90%, 750 h). No color change was observed even for the projections and recesses. For the comparison sake, the substrate without the planarizing process was tested and a color change was observed at 750 h and deliquescence was observed.

Figure 24D:
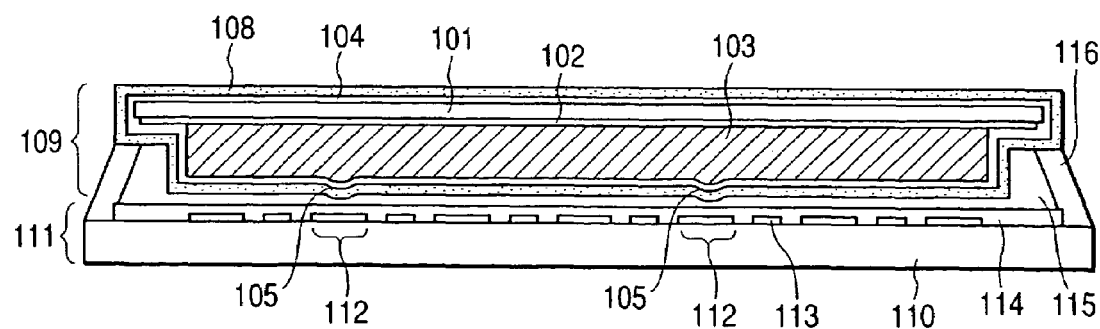

Next, as shown in FIG. 24D, the scintillator panel 109 is bonded to the sensor panel 111 by using adhesive agent 115. The load and speed of the roller are controlled so that the film thickness of the adhesion layer 115 is set to about 20 μm. In this manner, the scintillator panel 109 can be bonded to the sensor panel 111 without breaking the sensor panel 111 and without leaving air bubbles.

Sixth Embodiment

Figure 25A:
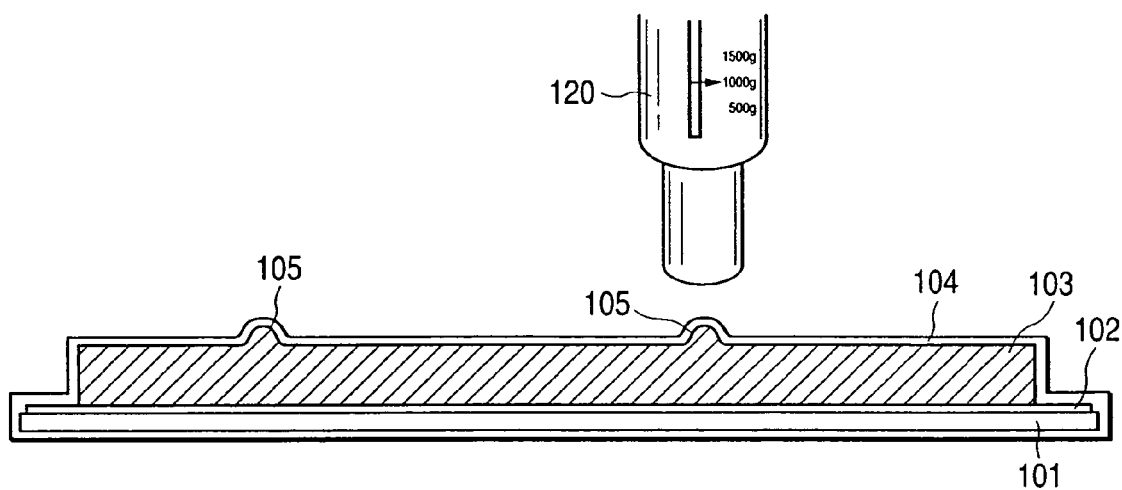
FIGS. 25A and 25B are cross sectional views illustrating a sixth embodiment of the invention.
Figure 25B:
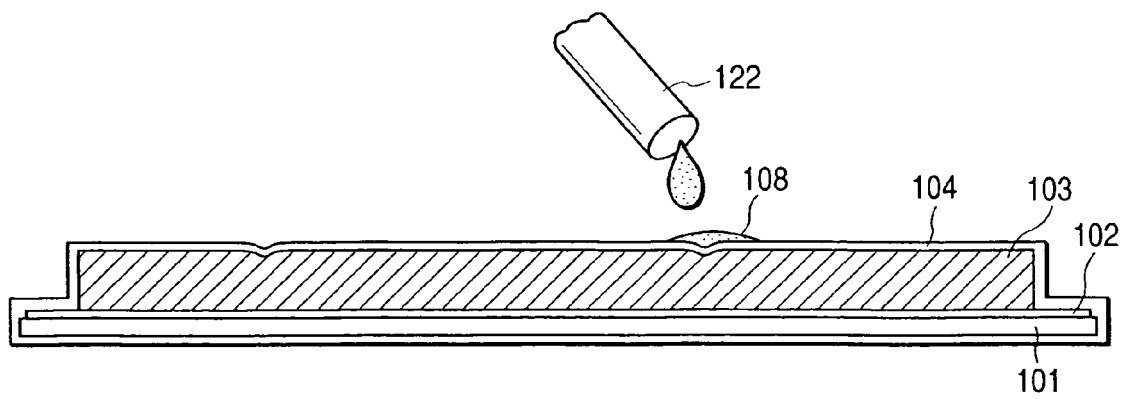

FIGS. 25A and 25B are cross sectional views of a scintillator panel according to the sixth embodiment. The materials of the scintillator panel 109 are similar to those of the fifth embodiment. In the sixth embodiment, the number of projections 105 is relatively small, about twenty. As shown in FIG. 25A, each projection is crushed by a push-pull gauge 120 without using a roller after the position of the projection is detected. Only those projections not planarized uniformly were scraped with a file having a diameter of 0.5 and a rotation function. Thereafter, as shown in FIG. 25B, UV hardening type acrylic resin was dropped from a dispenser 122 and hardened by a UV lamp to form the second protective layer 108. In this case, in order not to thicken only the dropped area, the hardening time was determined by taking into consideration the viscosity, surface tension, hardening contraction factor and the like of the UV hardening acrylic resin.

The structure of the scintillator panel 109 is similar to the fifth and sixth embodiments. As a means for planarizing projections on the phosphor surface, laser may be used. The depth of the projection to be burnt can be determined by setting the parameters including a laser exposure time, an exposure energy, the number of exposures and the like in accordance with the size and height of the projection. Each projection is detected by a substrate inspection apparatus, and the position coordinate data is sent to a laser repair apparatus to thereby fully automatically perform the planarizing process under the conditions matching the size and height of each projection. After the planarizing process, the projection shape is again measured by the substrate inspection apparatus and three-dimensional shape measurement apparatus to confirm whether the projections were planarized. If there is any higher projection, the laser repair is again performed until the final conditions are met.

With the laser planarizing process, it is possible to planarize the surfaces of the projections at a good precision and lower the height of each projection to 5 μm or lower. Adhesive. agent for bonding the scintillator panel and sensor panel may be used as the material of the second protective layer. Thermosetting acrylic resin having a high light transmittance and a low moisture permeability is used as the material of the second protective layer. It is possible to shorten the distance between the phosphor and sensor panel to about 10 μm so that a high resolution sensor panel can be realized (Parlylene≈5 μm, thermosetting acrylic resin≈5 μm).

Seventh Embodiment

Figure 26:
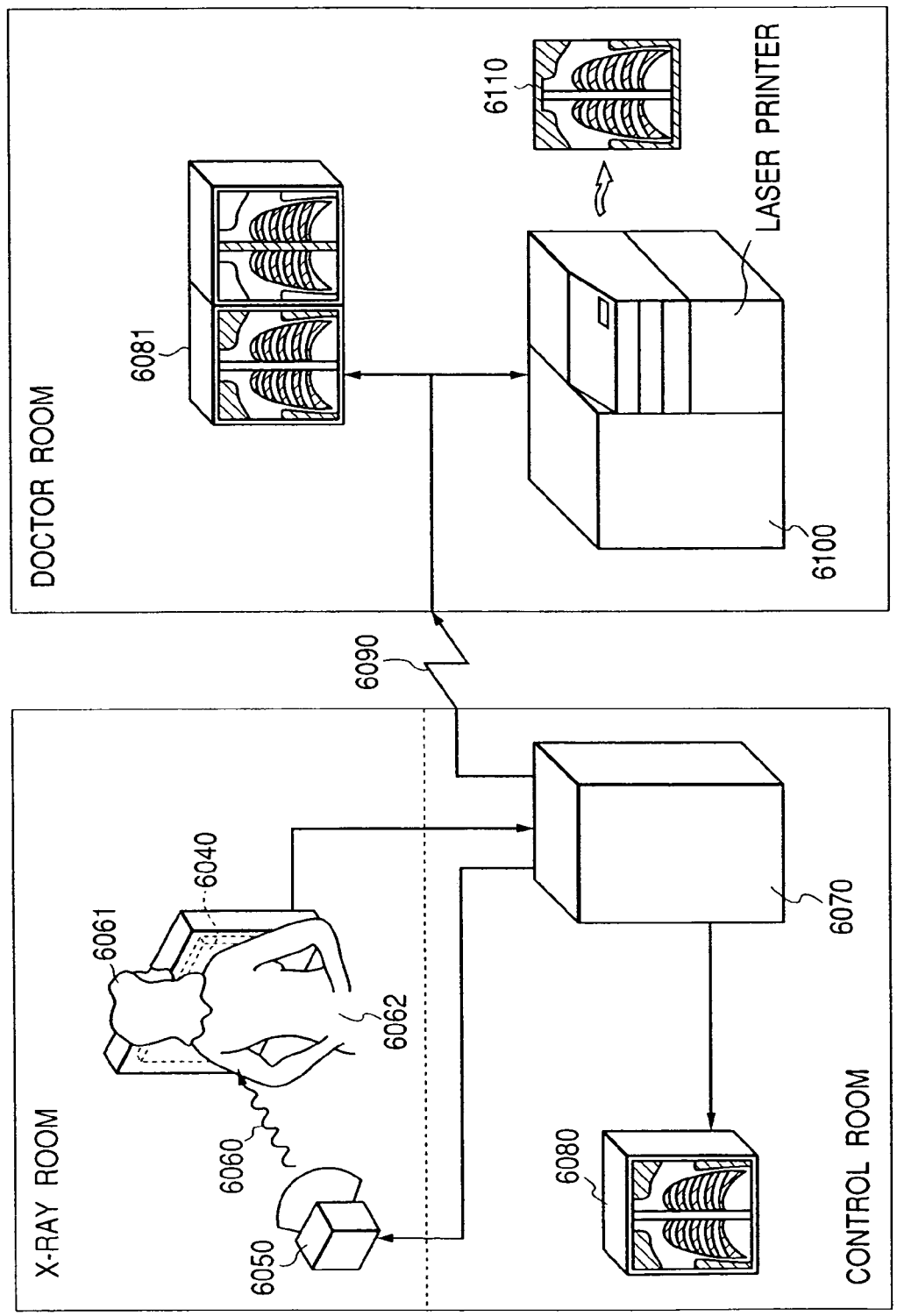
FIG. 26 is a diagram showing the configuration of a seventh embodiment of the invention.

FIG. 26 shows an example of an application of the radiation detector of each of the embodiments to a radiation detector system. In this embodiment, the scintillator panel and radiation detector are used as a radiation image pickup apparatus 6040 of the radiation image pickup system for picking up a radiation image. An X-ray 6060 generated from a radiation tube 6050 as a radiation generation source transmits through an observation region 6062 of an inspection object 6061 such as a chest, and becomes incident upon the X-ray image pickup apparatus 6040. Incident radiation contains the information of the inside of the inspection object 6061. The X-ray image pickup apparatus 6040 obtains electric information from the incident radiation. This electric information is converted into digital signals which are processed by an image processor 6070 as an image processing means and made visible on a display 6080 as a display means in a control room.

This information can be transmitted to a remote cite by a transmission means such as a telephone line or radio waves 6090 and made visible on a display 6081 in another doctor room or printed as a film so that a doctor at a remote cite can diagnose it. The information may be recorded by a recording means 6100 such as a film processor on a recording medium 6110 such as an optical disc, a magneto optical disc, a magnetic disc, a film, and a paper sheet.

What is claimed is:

1. A radiation detector comprising:
   a wavelength conversion member made of column-shaped crystal for converting radiation into light;
   a sensor panel for detecting light converted from the radiation by the wavelength conversion member,
   wherein the wavelength conversion member has, at a surface thereof, a flattened protrusion of the column-shaped crystal grown during a vapor deposition process,
   wherein the surface of the wavelength conversion member faces the sensor panel; and
   a protective layer through which the light from the wavelength conversion member is transmitted, wherein the protective layer comprises a first protective layer covering the wavelength conversion member and a second protective layer covering at least a region corresponding to the flattened protrusion.

2. A radiation detector according to claim 1, wherein a height of the flattened protrusion is 50 μm or lower.

3. A radiation detector according to claim 1, wherein the wavelength conversion member and the sensor panel are bonded together by an adhesion layer, and the adhesion layer has a thickness such that a resolution response to light converted by the wavelength conversion member is 0.7 or larger.

4. A radiation detector according to claim 1, wherein the wavelength conversion member is made of Cesium Iodide.

5. A radiation detector system having the radiation detector recited in claim 1, image processing means for processing signals output from the radiation detector as an image, recording means for recording signals output from the image processing means, display means for displaying signals output from the display means, and transmission means for transmitting signals output from the image processing means.

6. The scintillator panel according to claim 5, wherein the protrusion is formed by an abnormal growth of the column-shaped crystal partially on a surface of the wavelength conversion member during the vapor deposition process.

7. The scintillator panel according to claim 5, wherein the protective layer comprises a pair of layers.

8. The radiation detector according to claim 1, wherein the protrusion is formed by an abnormal growth of the column-shaped crystal partially on a surface of the wavelength conversion member during the vapor deposition process.

9. The radiation detector according to claim 1, wherein the protective layer comprises a pair of layers.

10. A scintillator panel for use with a sensor panel, comprising:

a substrate;

a wavelength conversion member made of a column-shaped crystal formed on said substrate for converting radiation into light, wherein the wavelength conversion member has, at a surface thereof, a flattened protrusion of the column-shaped crystal grown during a vapor deposition process, wherein the surface of the wavelength conversion member is to face the sensor panel; and a protective layer through which the light from the wavelength conversion member is transmitted, wherein the protective layer comprises a first protective layer covering the wavelength conversion member and a second protective layer covering at least a region corresponding to the flattened protrusion.

11. A scintillator panel according to claim 10, wherein a height of the flattened protrusion is 50 µm or lower.

12. A radiation detector having the scintillator panel recited in claim 10 and a sensor panel for detecting the light converted by the scintillator panel.

13. The method of manufacturing a scintillator panel according to claim 10, wherein the protrusion is formed by an abnormal growth of the column-shaped crystal partially on a surface of the wavelength conversion member during the vapor deposition process.

14. The method of manufacturing a scintillator panel according to claim 10, wherein the protective layer comprises a pair of layers.

15. A radiation detector according to claim 1, wherein the protective layer has a crack at a region corresponding to the flattened protrusion.

16. A radiation detector according to claim 15, wherein the crack is formed at flattening the protrusion, which is formed by an abnormal growth during growing the column-shaped crystal of the wavelength conversion member by the vapor deposition process.

17. A method of manufacturing a scintillator panel comprising a wavelength conversion member made of a column-shaped crystal for converting a radiation into a light, the method comprising the steps of:

flattening a protrusion of the column-shaped crystal grown during a vapor deposition process, wherein the protrusion is at a surface of the wavelength conversion member which is to face the sensor panel;

forming a first protective layer covering the wavelength conversion member, wherein the light from the wavelength conversion member is transmitted through the first protective layer; and forming a second protective layer covering at least a region corresponding to the flattened protrusion after the step of forming the first protective layer, wherein the light from the wavelength conversion member is transmitted through the second protective layer.

18. A method according to claim 17, wherein the height of the flattened protrusion after the step of flattening the protrusion is 50 µm or lower.

19. A method according to claim 17, wherein the protrusion is flattened by crushing the protrusion.

20. A method according to claim 17, wherein the protrusion is flattened by scraping the protrusion.

21. A method according to claim 17, wherein the protrusion is flattened by cutting off one or more portions of the protrusion.

22. A method according to claim 17, wherein the protrusion is flattened by using laser.

23. A method according to claim 17, wherein prior to flattening the protrusion, a height of the protrusion is measured, and if the height of the protrusion exceeds 20 µm, the protrusion is flattened.

24. A method according to claim 23, wherein the protrusion is measured in accordance with a detection result of a contrast of a surface image of the wavelength conversion member.

25. A method of manufacturing a radiation detector having a sensor panel, a substrate and a scintillator panel formed on the substrate according to claim 17, comprising a step of:

bonding the scintillator panel with the sensor panel.

26. A method according to claim 25, wherein the wavelength conversion member and the sensor panel are bonded together by an adhesion layer, and the protrusion is flattened so that a thickness of the adhesion layer is 50 µm at a maximum or thinner.

27. A method according to claim 17, wherein the step of forming the first protective layer, the step of flattening the protrusion, and the step of forming the second protective layer are performed in this order, wherein the protrusion is formed by an abnormal growth during growing the column-shaped crystal of the wavelength conversion member by the vapor deposition process.

28. A method according to claim 27, wherein the step of forming the second protective layer is performed to cover a crack formed in the region of the first protective layer corresponding to the protrusion.

29. A method according to claim 17, wherein the flattening of the protrusion is performed by crushing the protrusion with a roller rotating on the wavelength conversion member.

* * * * *

UNITED STATES PATENT AND TRADEMARK OFFICE
CERTIFICATE OF CORRECTION

PATENT NO.       : 7,244,945 B2
APPLICATION NO.  : 10/933249
DATED            : July 17, 2007
INVENTOR(S)      : Okada et al.

It is certified that error appears in the above-identified patent and that said Letters Patent is hereby corrected as shown below:

SHEET 9:
FIG. 10, "ADHESSION" should read -- ADHESION --.

COLUMN 3:
Line 54, "recessed" should read -- recesses --; and
Line 56, "give" should read -- given --.

COLUMN 4:
Line 58, "a imaging defect," should read -- an imaging defect, --.

COLUMN 6:
Line 45, "electric." should read -- electric --.

COLUMN 9:
Line 14, "11" should read -- 114 --;
Line 26, "phosphor layer 110" should read -- scintillator panel 110 --; and
Line 28, "phosphor layer 110." should read -- scintillator panel 110. --.

COLUMN 10:
Line 37, Delete "and 101"; and
Line 59, "phosphor layer 110" should read -- scintillator panel 110 --.

COLUMN 11:
Line 45, "phosphor layer 110" should read -- scintillator panel 110 --.

COLUMN 12:
Line 51, "projection" should read -- projections --; and
Line 51, "recess" should read -- recesses --.

COLUMN 13:
Line 18, Delete "film";
Line 43, "projection" should read -- projections --; and
Line 44, "recess" should read -- recesses --.

COLUMN 14:
Line 48, "off." should read -- off --.

COLUMN 17:
Line 48, "Adhesive." should read -- Adhesive --.

UNITED STATES PATENT AND TRADEMARK OFFICE
CERTIFICATE OF CORRECTION

PATENT NO. : 7,244,945 B2
APPLICATION NO. : 10/933249
DATED : July 17, 2007
INVENTOR(S) : Okada et al.

It is certified that error appears in the above-identified patent and that said Letters Patent is hereby corrected as shown below:

COLUMN 18:
Line 10, "cite" should read -- site --;
Line 13, "cite" should read -- site --;
Line 54, "scintillator panel" should read -- radiation detector system --; and
Line 58, "scintillator panel" should read -- radiation detector system --.

Signed and Sealed this

Seventeenth Day of June, 2008

JON W. DUDAS
*Director of the United States Patent and Trademark Office*